(12) United States Patent
Morioka et al.

(10) Patent No.: US 8,213,768 B2
(45) Date of Patent: Jul. 3, 2012

(54) PACKET TRANSMITTING APPARATUS

(75) Inventors: Yoshihiro Morioka, Nara (JP); Naoshi Usuki, Kyoto (JP); Toshihiko Munetsugu, Osaka (JP)

(73) Assignee: Panasonic Corporation, Osaka (JP)

( * ) Notice: Subject to any disclaimer, the term of this patent is extended or adjusted under 35 U.S.C. 154(b) by 1337 days.

(21) Appl. No.: 11/885,568

(22) PCT Filed: Mar. 7, 2006

(86) PCT No.: PCT/JP2006/304404
§ 371 (c)(1),
(2), (4) Date: Sep. 4, 2007

(87) PCT Pub. No.: WO2006/095742
PCT Pub. Date: Sep. 14, 2006

(65) Prior Publication Data
US 2009/0123131 A1 May 14, 2009

(51) Int. Cl.
*H04N 9/80* (2006.01)
*H04N 5/765* (2006.01)
(52) U.S. Cl. .......................... 386/252; 386/200; 386/231
(58) Field of Classification Search .................. None
See application file for complete search history.

(56) References Cited

U.S. PATENT DOCUMENTS

| | | | |
|---|---|---|---|
| 7,039,293 B1 | 5/2006 | Aoki | |
| 7,218,738 B2 * | 5/2007 | Pedlow et al. | ........... 380/218 |
| 7,228,422 B2 | 6/2007 | Morioka et al. | |
| 7,433,472 B2 * | 10/2008 | McLean et al. | ........... 380/255 |
| 2003/0145329 A1 * | 7/2003 | Candelore | ........... 725/87 |
| 2005/0216731 A1 | 9/2005 | Saito et al. | |
| 2007/0271470 A9 * | 11/2007 | Candelore et al. | ........... 713/191 |

FOREIGN PATENT DOCUMENTS

| | | |
|---|---|---|
| EP | 1 126 454 | 8/2001 |
| EP | 1 710 798 | 10/2006 |
| JP | 2000-59463 | 2/2000 |

(Continued)

OTHER PUBLICATIONS

Sugimura et al., Nikkei Electronics (No. 852), Jul. 21, 2003, p. 131, (partial translation, left column, line 8 to right col. line 7 and Fig. 8).

*Primary Examiner* — William C Vaughn, Jr.
*Assistant Examiner* — Heather Jones
(74) *Attorney, Agent, or Firm* — Wenderoth, Lind & Ponack, L.L.P.

(57) ABSTRACT

A packet transmitting apparatus (401) capable of transmitting a copyright-protected content across an IP network includes: a transmission condition setting/managing unit (403) that extracts from inputted non-A/V data or A/V data at least one information of billing information, reproduction control information, copy control information for the A/V data, and packet output control information, and generate encryption mode information indicating an encryption mode which becomes a condition during transmission of the A/V data; an encrypted data generation unit (422) that encrypts inputted A/V data based on a transmission condition determined by combining input terminal information, data format information, and attribute information, and adds an encryption information header based on the encryption mode information and time-based discontinuity information to the encrypted A/V data so as to generate encrypted data; and a packetization unit (406) that generates a packet by adding a packet header and information representing a time-based discontinuity point to the generated encryption data.

7 Claims, 17 Drawing Sheets

FOREIGN PATENT DOCUMENTS

| | | |
|---|---|---|
| JP | 2000-251391 | 9/2000 |
| JP | 2000-287192 | 10/2000 |
| JP | 2003-18567 | 1/2003 |
| JP | 2003-111048 | 4/2003 |
| JP | 2004-194295 | 7/2004 |
| JP | 2004-350043 | 12/2004 |
| WO | 01/04893 | 1/2001 |

* cited by examiner

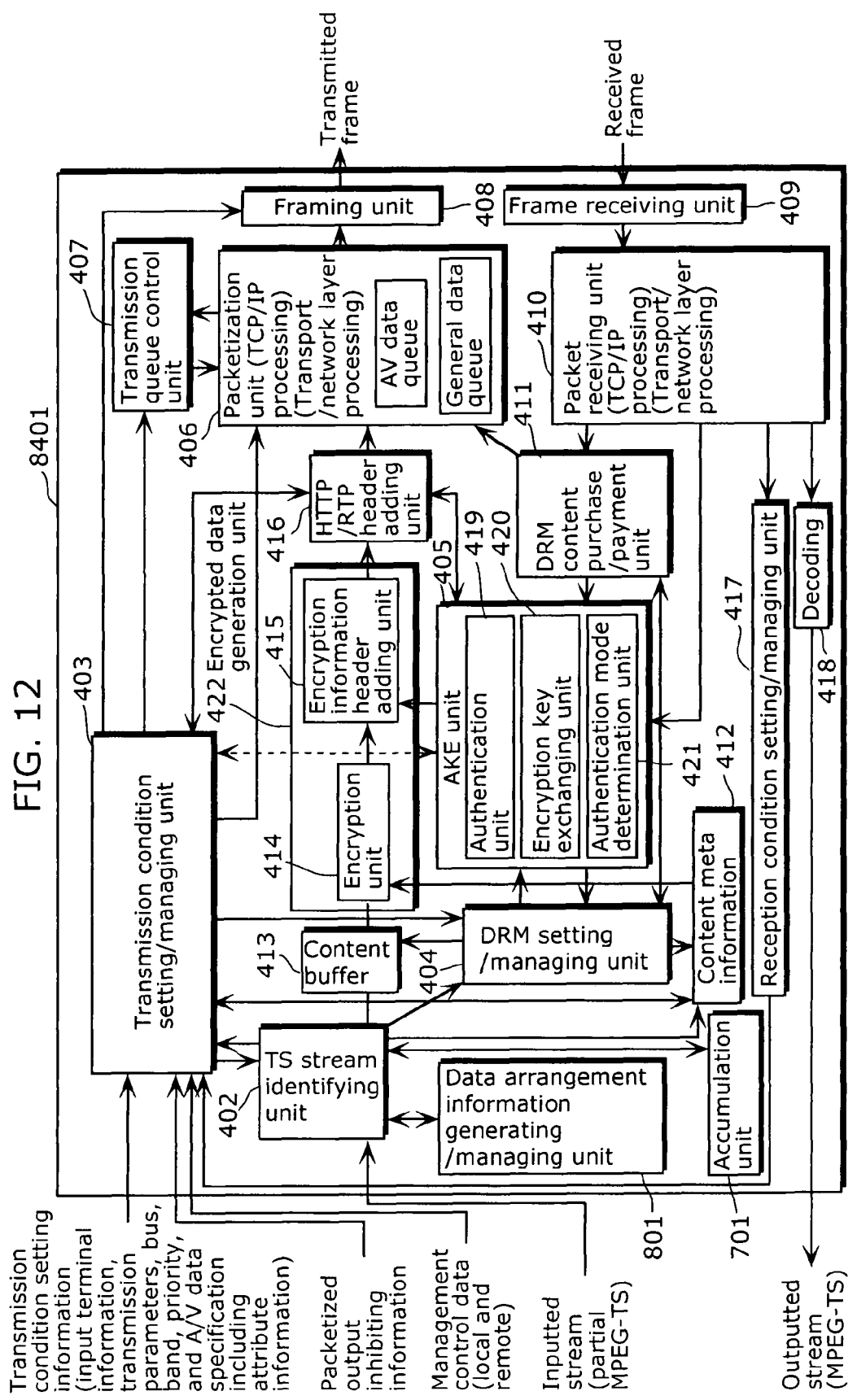

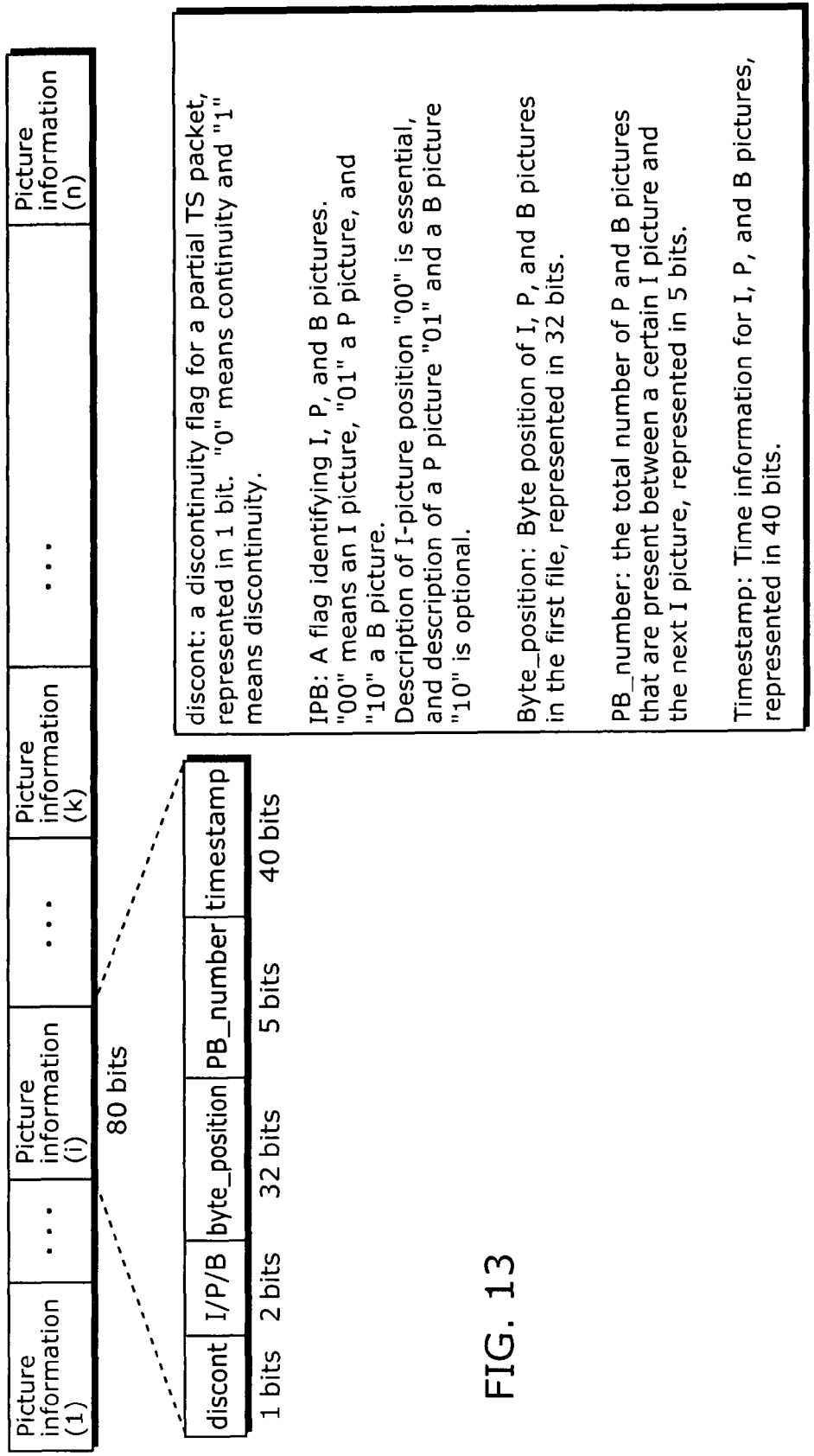
FIG. 13 Configuration of a picture information file (PIF)

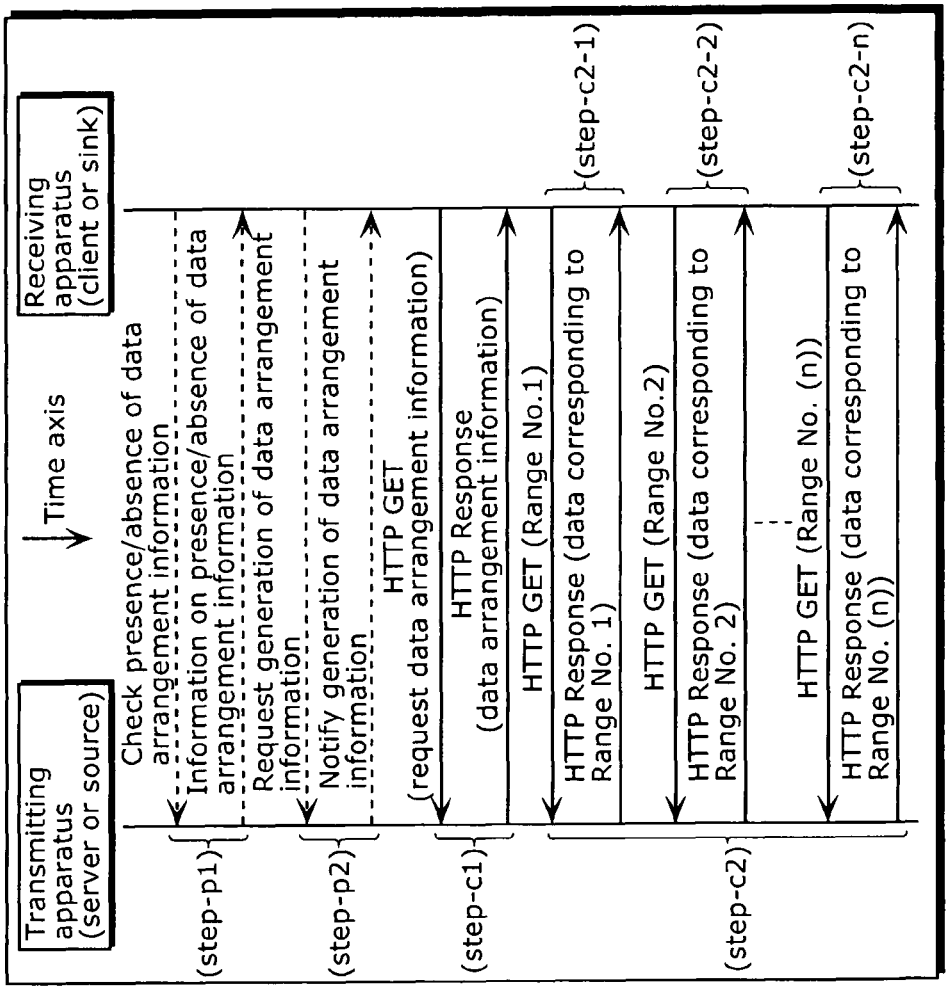
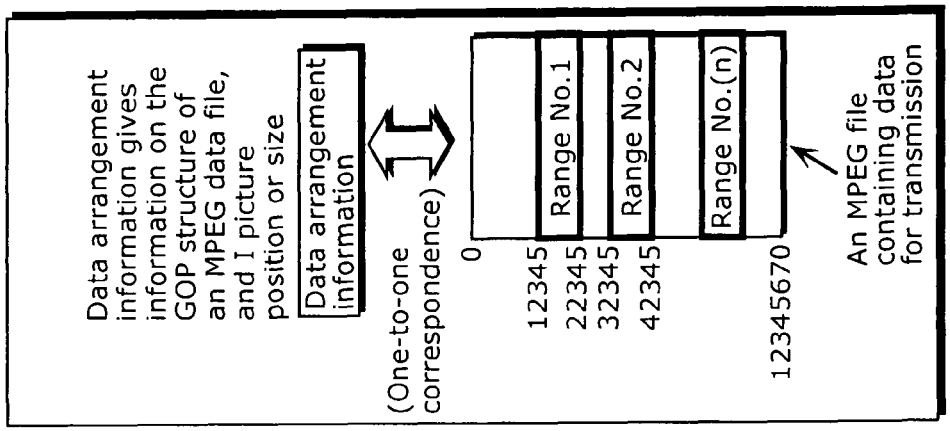

PACKET TRANSMITTING APPARATUS

TECHNICAL FIELD

The present invention relates to a packet transmitting apparatus which transmits an encrypted A/V stream as IP packets with high quality by using an Ethernet™ (wired LAN) such as IEEE 802.3, or a wireless LAN such as IEEE 802.11, and particularly to a technique for transmitting an A/V stream across an IP network in a form suited for trick play such as fast forward, fast rewind, and slow reproduction, while seeking content protection.

BACKGROUND ART

Along with the development of communication techniques in recent years, various techniques for efficient packet transmission have been proposed (see Patent Reference 1, for instance). As an example of such techniques, conventionally, a digital broadcast tuner and a DVHS-based video recorder may be interconnected by a digital interface based on the IEEE 1394, in a room of a ordinary household, and Moving Picture Experts Group/Transport Stream (MPEG-TS) signals, which is defined in IEC 61883-4, are transmitted between them. In such a case, when content protection, such as Copy One Generation, is applied to a broadcast content, the content is transmitted being encrypted in order to protect the content from unauthorized copying.

As an example of a method for transmitting encrypted A/V data, such as an MPEG-TS, which is obtained by receiving digital broadcasting and selecting a channel, Digital Transmission Content Protection (DTCP) method has been defined. The DTCP is a technique for protecting contents on transmission media such as IEEE1394 and USB. The DTCP method is a method standardized by Digital Transmission Licensing Administrator (DTLA), and is described at hyperlink "http://www.dtcp.com" http://www.dtcp.com, hyperlink "http://www.dtcp.com/data/dtcp#tut.pdf" http://www.dtcp.com/data/dtcp#tut.pdf, hyperlink "http://www.dtcp.com/data/wp#spec.pdf" http://www.dtcp.com/data/wp#spec.pdf, or in "Chapter 8: Copy Protection" of a book titled "IEEE 1394; A/V Kiki-eno-ouyou" ("IEEE 1394: Application to A/V devices"), supervised by Shinji Takada, Nikkankogyo Shinbun, pp. 133 to 149.

The MPEG-TS is described. A transport stream is a collection of a number of transport packets (TS packets). A TS packet is a fixed-length packet of 188 bytes, and the length has been determined in consideration of the consistency with the cell length of ATM as well as applicability in a case where error correcting encoding, such as Reed-Solomon code, is performed. The TS packet is made up of a fixed-length packet header of 4 bytes, an adaptation field of a variable length, and a payload. In the packet header, a PID (packet identifier) and/or various flags are defined. This PID identifies the type of the TS packet.

Either one or both of the adaptation_field and the payload may be present, and their presence/absence can be identified with a flag (adaptation_field_control) in the packet header. The adaptation_field has the functions of transmitting information, e.g., PCR (Program_Clock_Reference), and stuffing within a TS packet for making the length of the TS packet a fixed length of 188 bytes.

The PCR is a timestamp of 27 MHz, and the value of the PCR is referenced in order to reproduce the reference time at the time of encoding in a STC of a decoder. For a TS of MPEG-2, the System Time Clock (STC) of a decoder has PLL synchronization function based on PCR. To stabilize the PLL synchronization operation, the interval of PCR transmission is 0.1 ms at the maximum. An MPEG PES packet containing individual streams such as video and audio is transmitted being divided into payloads for a plurality of TS packets having the same PID number. In addition, the beginning of a PES packet is configured to start at the beginning of a TS packet.

Since a transport stream can transmit a number of programs, table information is used that represents the relationship between the programs contained in the stream and program elements that make up the programs, such as video and audio streams. This table information is called Program Specific Information (PSI), and uses such a table as a Program Association Table (PAT) and a Program Map Table (PMT). The PSI in a PAT or PMT is transmitted being placed in the payload of a TS packet in units called section.

In a PAT, the PID of an PMT corresponding to a program number and the like is designated, and in the PMT, PIDs of video, audio, and additional data contained in the corresponding program as well as the PID of PCR are described, so that only TS packets that constitute a target program can be retrieved from a stream by referencing the PAT and the PMT.

Reference documents on TS include CQ Publishing CO., Ltd., TECH I Vo. 4, "Gazou & Onsei asshuku gijutsu no subete (Internet/dejitaru TV, mobairu tsuushin jidaino hissu gijutsu)" ("All about image & audio compression techniques (essential techniques for the Internet/digital TV and mobile communication era)", supervised by Hiroshi Fujiwara, Chapter 6 "Gazou ya onseiwo tajuukasuru MPEG sisutemu (MPEG system for image/audio multiplexing)", for example, which provides commentary on TS.

Logical hierarchy structures, exemplary processing procedures, and exemplary channel selection processing relating to PSI and/or SI are described in Miyake et al., "Dejitaru housou jushinki ni okeru senkyoku gijutsu (Channel selection techniques for digital broadcast receivers), Sanyo Electric Gihou (technical journal) Vol. 36, June 2004, 74th issue, pp. 31 through 44.

In relation to an access control method used in digital broadcasting, specifications of scrambling and relevant information as well as associated specifications of a receiver are defined in the ARIB standard, ARIB STD-B25, and the operation thereof is defined in ARIB technical materials, ARIB TR-B14 and ARIB TR-B15.

FIG. 1(a) shows an example of MPEG-TS transmission by IEEE1394 using the DTCP method. In the DTCP method, the sending side (a packet transmitting device) is called a source 901 and the receiving side (a packet receiving device) is called a sink 902, where an encrypted content, such as an MPEG-TS, is transmitted from the source 901 to the sink 902 via a network 903. FIG. 1(b) provides examples of source and sink devices as additional information.

FIG. 2 is a diagram generally illustrating a conventional packet communication unit in the DTCP method, where both a packet transmitting unit of the source 901 and a packet receiving unit of the sink 902 shown in FIG. 1 are illustrated as a packet transmitting/receiving unit. First, authentication and key exchange (abbreviated as AKE) compliant with the DTCP method are performed. Setting information for the authentication and key exchange is inputted to an AKE unit 1001, from which the information is delivered to a packetization unit 1002 in which the information is packetized with a predetermined header added thereto, and is outputted to a network 1007.

Here, the packetization unit 1002 performs packetization and transmission of inputted data in accordance with transmission parameters determined by a transmission condition setting unit 1003. On the receiving side, a signal inputted from the network 1007 is filtered by the packet receiving unit 1004 by identifying packet headers and the like, and inputted to the AKE unit 1001. This enables the AKE unit of the sending side (i.e., the source) and the AKE unit of the receiving side (i.e., the sink) to communicate messages with each other via the network 1007. Specifically, they perform authentication and key exchange in accordance with the procedure of the DTCP method.

Once authentication and key exchange succeed between the sending side (the source) and the receiving side (the sink), A/V data transmission is then performed. In the source, after an MPEG-TS signal is inputted to an encryption unit 1005 to become encrypted, the encrypted MPEG-TS signal is inputted to the packetization unit 1002, from which the signal is outputted to the network 1007. In the sink, the signal inputted from the network 1007 is filtered by the packet receiving unit 1004 by identifying packet headers and the like, and is inputted to and decoded by a decoding unit 1006, which outputs the MPEG-TS signal.

Next, using FIG. 3, the above-mentioned procedure is additionally described. It is assumed in FIG. 3 that the source and the sink are connected by IEEE1394. First, a request for content transmission occurs on the source side. Then, an encrypted content and protection mode information for the content are transmitted from the source to the sink. The sink analyzes the copy protection information of the content, determines which of a full authentication method or a limited authentication method to use, and sends an authentication request to the source. The source and the sink seek sharing of an authentication key through predetermined processing of DTCP. Then, the source encrypts an exchanged key using the authentication key and sends it to the sink, and the sink decodes the exchanged key.

To make an encryption key change over time, the source generates seed information that temporally changes, and transmits the information to the sink. The source generates an encryption key from the exchanged key and the seed information, and encrypts an MPEG-TS in the encryption unit using the encryption key, and transmits the key to the sink. The sink receives the seed information, and reconstructs a decoding key from the exchanged key and the seed information. The sink uses the decoding key to decode the encrypted MPEG-TS signal.

FIG. 4 shows an example of an IEEE1394 isochronous packet for a case where an MPEG-TS signal is transmitted in FIG. 1. This packet is composed of a 4-byte (32-bit) header, a 4-byte (32-bit) header CRC, a 224-byte data field, and a 4-byte (32-bit) trailer. Out of a CIP header and a TS signal that constitute the 224-byte data field, only the TS signal is encrypted during transmission, other data not being encrypted. Here, information specific to the DTCP method is a 2-bit Encryption Mode Indicator (EMI), which is copy protection information, and O/E (Odd/Even), which is the LSB bit of seed information, and these are transmitted being unencrypted because they are present in the 32-bit header described above.

As has been described above, an MPEG-TS signal is transmitted in accordance with the conventional DTCP method over a transmission channel defined by IEEE1394 while seeking content protection.

Patent Reference 1: Japanese Unexamined Patent Application Publication No. 2000-59463

DISCLOSURE OF INVENTION

Problems that Invention is to Solve

However, the conventional DTCP method described above does not show a technique for transmitting a content using the Internet Protocol (IP), which is the standard protocol for the Internet, over an Ethernet™ (IEEE802.3), a wireless LAN (IEEE802.11), or other network over which an IP packet can be transmitted while seeking content protection as has been conventionally done.

In particular, at present, no technique is yet known that is effective for transmitting a content accumulated on a hard disk and the like of a server on demand from a terminal while seeking protection of the content and in a form that can easily realize trick play, such as fast forward, fast rewind, and slow reproduction, to the requesting terminal.

As digital televisions and home servers are rapidly becoming commonplace in homes, there is a growing need to view contents subject to digital copyright protection that are obtained from broadcasting and the like through a home digital TV or a home server on various devices in homes, such as personal computers, across a home LAN which is realized by an IP network, and users wish to enjoy the convenience of trick play, such as fast forward, fast rewind, and slow reproduction, also in such a way of viewing. However, conventional techniques fail to meet this demand of users.

The present invention has been made in view of such a circumstance, and has an object of providing a packet transmitting apparatus that is capable of transmitting an A/V content across an IP network utilizing the HTTP protocol or RTP protocol while seeking content protection, and particularly in a form suited for trick play, such as fast forward, fast rewind, and slow reproduction.

Means to Solve the Problems

In order to solve the aforementioned problem, the packet transmitting apparatus in the present invention is a packet transmitting apparatus that transmits packet data to a packet receiving apparatus, the packet transmitting apparatus includes: an A/V data information acquisition unit which acquires A/V data information including at least one information from among input terminal information which indicates a terminal to which A/V data is inputted, data format information which indicates a data format of the A/V data, and attribute information which indicates an attribute of the A/V data; a data input unit which accepts input of the A/V data and non-A/V data; a transmission condition setting/managing unit which extracts, from the non-A/V data or the A/V data, at least one information from among: billing information or reproduction control information or copy control information for the A/V data; packet data transmission permitting information; and MAC address information for a transmission destination, and generates, from the extracted information, encryption mode information which indicates an encryption mode during transmission of the A/V data; an encrypted transmission data generation unit which performs encryption control on the A/V data inputted from the data input unit based on a transmission condition which is determined by combining the input terminal information, the data format information, and the attribute information, and generates encryption-controlled transmission data with an encryption information header by adding, to the encryption-controlled A/V data, the encryption information header which is based on the encryption mode information; a packetization unit which generates a packet by adding a packet header which combines one or more protocols from among a Hyper-Text Transfer Protocol, a Transmission Control Protocol, a Real-time Transport Protocol, a User Datagram Protocol, and an Internet Protocol to data including the encryption-controlled transmission data with an encryption information header generated by the encrypted transmission data generation unit, and adding information representing discontinuity of an MPEG stream in terms of system time base, at a point where time-based discontinuity occurs in the A/V data; an authentication unit which performs authentication processing with the packet receiving apparatus; a transmission protocol determination unit which determines a transmission protocol for the A/V data between the packet transmitting apparatus and the packet receiving apparatus, by using at least one of the input terminal information, the attribute information, and information which indicates a transmission mode specified by the packet receiving apparatus; and a transmission unit which transmits, in accordance with the transmission protocol determined by the transmission protocol determination unit, the packet including the encryption-controlled transmission data with an encryption information header generated by the packetization unit to the packet receiving apparatus, after authentication processing with the packet receiving apparatus is completed through the authentication processing, wherein, when the A/V data is accumulated in a recording medium which is made up of a plurality of data block areas having a predetermined size, and a recording position of the A/V data is managed with an identification number of one of the plurality of data block areas and offset information from the beginning of the data block area, only the A/V data is packetized and transmitted to the packet receiving apparatus by excluding unneeded data that is recorded outside a range specified by the identification number and the offset information.

Furthermore, it is possible that the authentication unit performs acquisition of address information for the A/V data and authentication processing with the packet receiving apparatus, by using URI information or extended URI information for the A/V data in the packet transmitting apparatus.

Furthermore, it is preferable that the packetization unit omits adding the information which represents discontinuity of an MPEG stream in terms of system time base at a point where the A/V data being transmitted is divided due to re-establishment of a connection on a communication line during data transmission by the HyperText Transfer Protocol.

Furthermore, it is possible that the packetization unit makes a data length to be inserted into a HyperText Transfer Protocol response a length which is an original data length plus the length of information that represents the time-based discontinuity, and in such a case, it is possible that the packetization unit supplies offset information for acquiring valid data by offsetting information about a start position or an end position of valid data within transmitted data by the length of the information which represents the time-based discontinuity.

Note that the present invention can be realized not only as such a packet transmitting apparatus, but also as a packet transmitting method, a program for a packet transmitting apparatus, or a computer-readable recording medium such as a CD-ROM or DVD-RAM which has the program recorded thereon.

EFFECTS OF THE INVENTION

According to the packet transmitting apparatus of the claimed invention, it is made possible to maintain the secrecy of an A/V stream utilizing the HTTP protocol or the RTP protocol while securing signal compatibility between packet transmitting and receiving devices by determining an encryption mode in accordance with a transmission condition which is according to certain rules externally given for an A/V stream such as an MPEG-TS signal and further determining the addition of an encryption information header. Here, copy control information (CCI) for a stream is externally given, and whether to add an encryption information header, an encryption mode for transmission, and the like are determined.

As a result of this, a copy control mode set by the copyright holder of an A/V content can be passed correctly and without omission because an A/V stream such as an MPEG-TS signal is transmitted being packetized after an encryption mode is determined in accordance with the copy control information for the stream and an encryption information header is added. Accordingly, as a total system, protection of an A/V content copyright can be sought while securing signal compatibility between packet transmitting and receiving devices.

Moreover, since information indicative of discontinuity is added at a time-based discontinuity point in the transmitted A/V stream, time-based discontinuity points can be shown on the packet receiving apparatus which is supplied with the A/V stream, which enables smooth trick play, such as fast forward, fast rewind, and slow reproduction.

BRIEF DESCRIPTION OF DRAWINGS

FIG. 12 is a block diagram of the packet transmitting/receiving unit according to the present invention;

FIG. 13 shows the structure of a picture information file;

FIG. 14(*a*) shows an example of A/V data to be transmitted as packets by HTTP according to the present invention, FIG. 14(*b*) is a sequence chart showing an example of a transmission procedure, and FIG. 14(*c*) shows an example of transmitted data;

Figure 1:
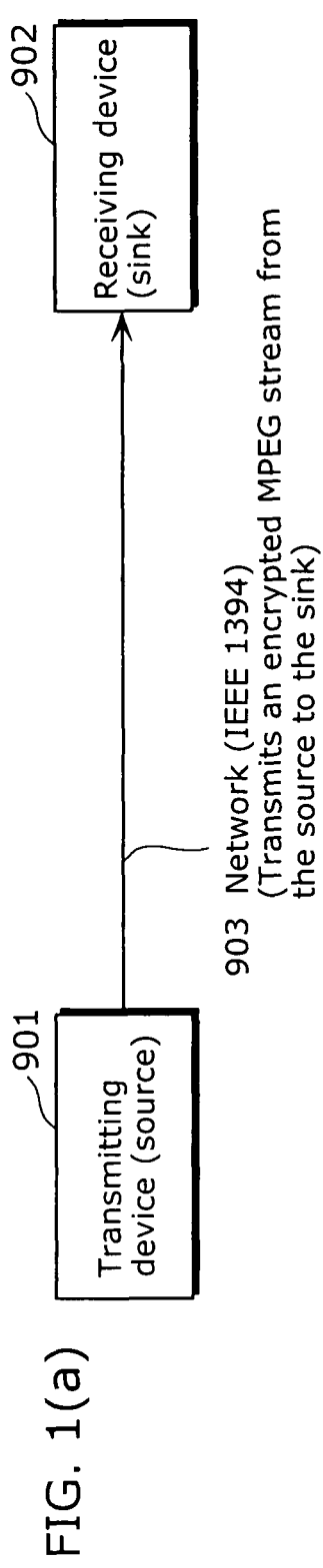
FIG. 1 (*a*) is a diagram illustrating a transmission/reception system according to a conventional technique and FIG. 1 (*b*) shows examples of source and sink devices.
Figure 2:
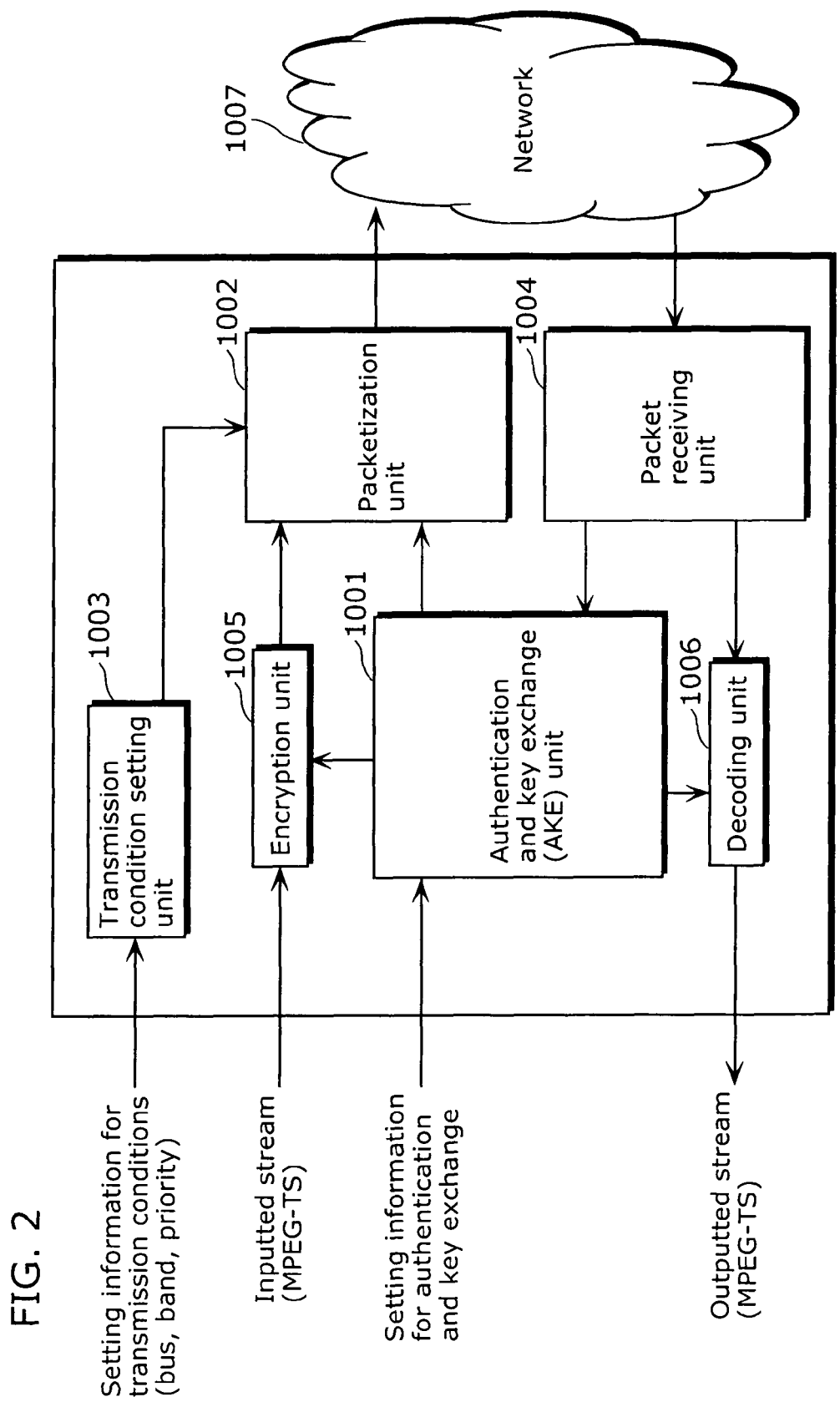
FIG. 2 is a block diagram of a packet transmitting/receiving unit according to a conventional technique.
Figure 3:
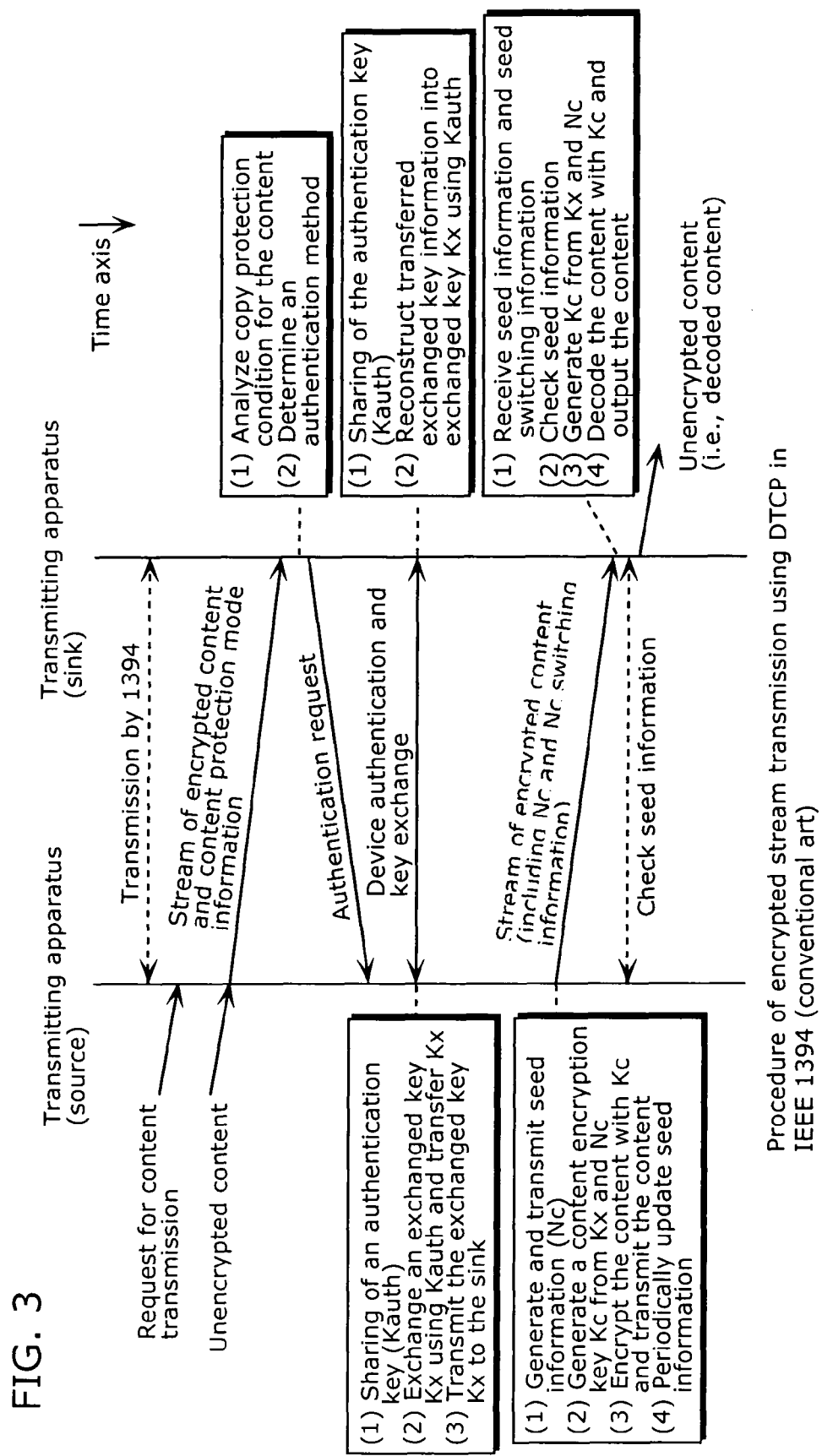
FIG. 3 is a diagram illustrating the procedure of content transmission by the DTCP method using 1394, which is a conventional technique.
Figure 4:
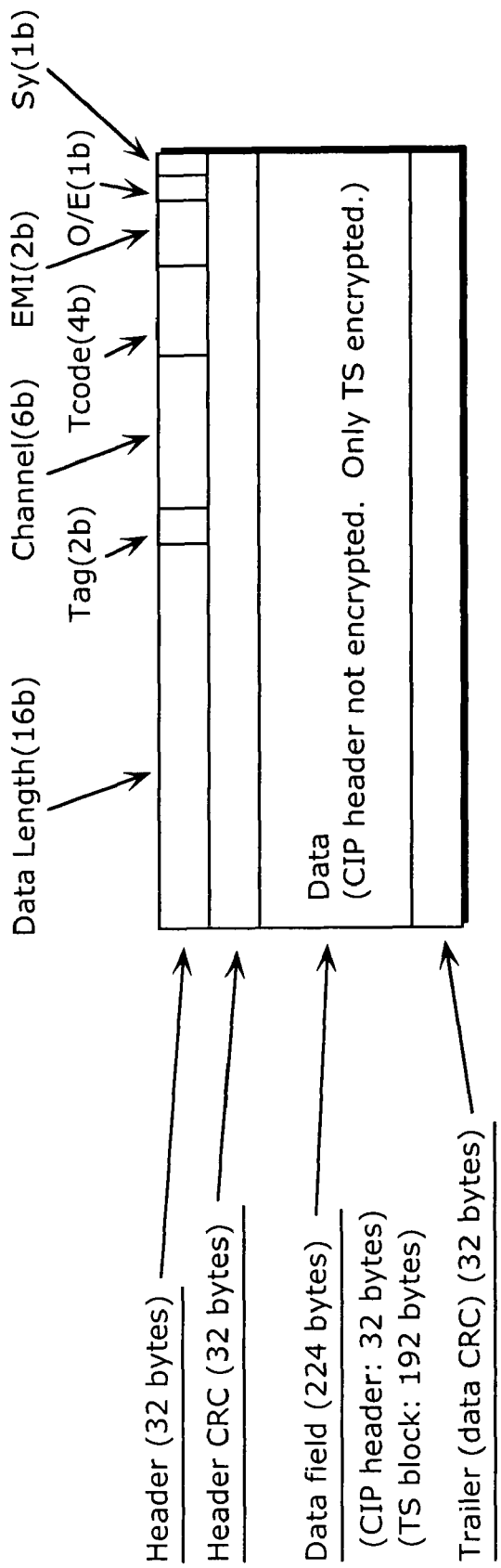
FIG. 4 is a diagram illustrating a packet format according to the DTCP method using 1394, which is a conventional technique.

| Numerical References | |
|---|---|
| 101 | Packet transmitting device |
| 102 | Router |
| 103 | Packet receiving device |
| 301, 302 | Network system |
| 303 | Router |
| 304 | Switching hub |
| 305 | Network |
| 401 | Packet transmitting/receiving unit |
| 402 | TS stream identifying unit |
| 403 | Transmission condition setting/managing unit |
| 404 | DRM setting/managing unit |
| 405 | AKE unit |
| 406 | Packetization unit |
| 407 | Transmission queue control unit |
| 408 | Framing unit |
| 409 | Frame receiving unit |
| 410 | Packet receiving unit |
| 411 | DRM content purchase/payment unit |
| 412 | Content meta information |
| 413 | Content buffer |
| 414 | Encryption unit |
| 415 | Encryption information header adding unit |
| 416 | HTTP/RTP header adding unit |
| 417 | Reception condition setting/managing unit |
| 418 | Encrypted data decoding unit |
| 419 | Authentication unit |
| 420 | Encryption key exchanging unit |
| 421 | Authentication mode determination unit |
| 422 | Encrypted data generation unit |
| 701 | Accumulation unit |
| 801 | Data arrangement information generating/managing unit |
| 901 | Source |
| 902 | Sink |
| 903 | Network |
| 1001 | AKE unit |
| 1002 | Packetization unit |
| 1003 | Transmission condition setting unit |
| 1004 | Packet receiving unit |
| 1005 | Encryption unit |
| 1006 | Decoding unit |
| 1007 | Network |
| 1701 | CCI buffer |
| 7401, 8401, 17401 | Packet transmitting/receiving unit |

BEST MODE FOR CARRYING OUT THE INVENTION

An embodiment of the present invention is described below in detail using drawings.

A packet transmitting apparatus according to an embodiment of the present invention is an apparatus that transmits a portion of an A/V stream requested by a packet receiving apparatus across an IP network while protecting its copyright to the packet receiving apparatus, being characterized in that it includes discontinuity information at a time-based discontinuity point in the transmitted A/V stream.

This reveals the time-based discontinuity point on the packet receiving apparatus which is supplied with the copyright-protected A/V stream across the IP network, and enables smooth reproduction of the A/V stream.

To clarify the features of the packet transmitting apparatus of the present invention, the following describes in this order: [1] the overview of the configuration of a communication system including the packet transmitting apparatus of the present invention and realization of copyright protection, [2] details of a configuration for transmitting an A/V stream across an IP network while protecting a copyright, [3] details of a configuration for transmitting a specified portion of an accumulated A/V stream, and [4] details of a configuration for transmitting a specified portion more efficiently, and then describes [5] details of a configuration for transmitting time-based discontinuity information, which characterizes the present invention in combination with those configurations, and finally describes [6] a variation for delivering copy control information using a dedicated delivery channel.

[1] The Overview of the Configuration of a Communication System Including the Packet Transmitting Apparatus of the Present Invention and Realization of Copyright Protection First, description is given of the overview of a communication system that is configured including the packet transmitting apparatus of the present invention as well as realization of copyright protection.

Figure 5:
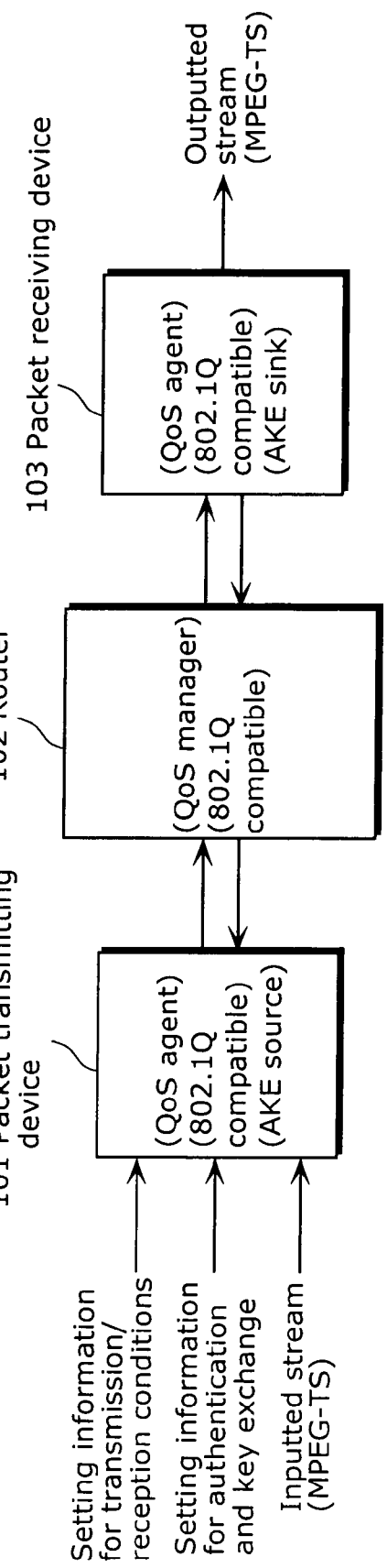
FIG. 5 is a diagram illustrating a transmission/reception system according to the present invention.

FIG. 5 shows an example of the communication system that is configured including the packet transmitting apparatus of the present invention. This communication system is composed of a packet transmitting device 101 that transmits packets, a router 102 which performs packet routing, and a packet receiving device 103 that receives packets.

By way of example, the packet transmitting device 101 and the packet receiving device 103 may be realized as a pair of equivalent packet transmitting/receiving devices that have the functions of both the devices 101 and 103. In that case, the packet transmitting device 101 functions as the sending side, and the packet receiving device 103 functions as the receiving side. A portion associated with the A/V stream transmission function of such a packet transmitting/receiving device represents an example of the packet transmitting apparatus of the present invention.

Figure 6:
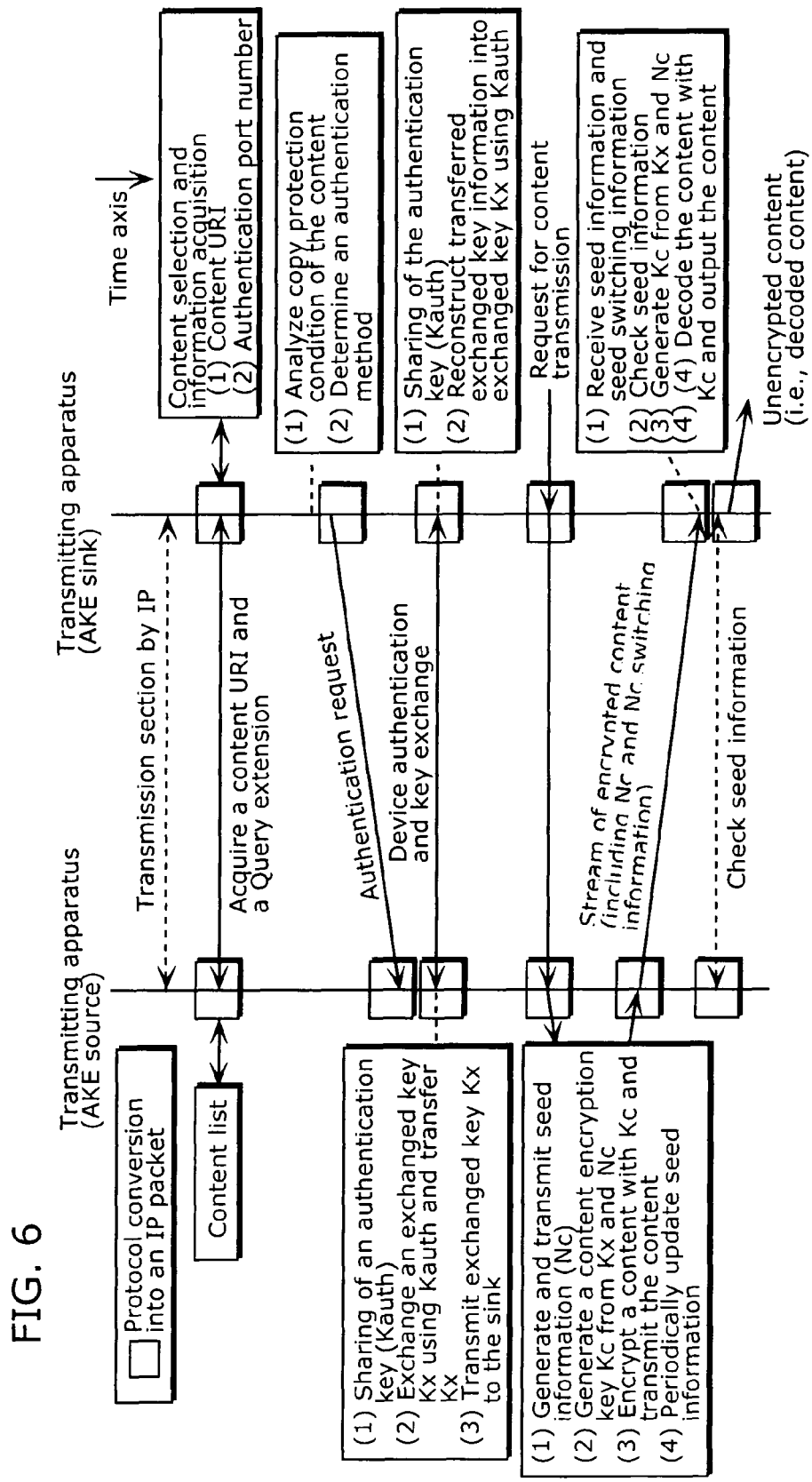
FIG. 6 is a diagram illustrating the procedure of content transmission according to the present invention in a case where the DTCP method is applied to key exchange.

To the packet transmitting device 101, setting information for transmission/reception conditions, setting information for authentication and key exchange, and an inputted stream (a content such as an MPEG-TS) are inputted, and as illustrated in FIG. 6, the packet transmitting device 101 performs communication with the router 102 in accordance with procedural steps 1 to 3 shown below. Here, copyright protection for a transmitted content is realized based on copy protection that uses authentication and encryption.

<Procedural Step 1> Set Transmission/Reception Parameters.

(Procedural step 1-1) Set a Media Access Control (MAC) address, an IP address, a TCP/UDP (User Datagram Protocol) port number, and the like of packet transmitting and receiving devices. An automatic setting function of UPnP and the like can be used.

(Procedural step 1-2) Set the type and band of a signal to be transmitted. Make settings on operation of a network using the IEEE802.1Q standard (VLAN: Virtual LAN) among the packet transmitting device 101 and the packet receiving device 103 which operate as QoS (Quality of Service) agents, and the router 102 which operates as a QoS manager.

(Procedural step 1-3) Set priority (operation according to IEEE802.1Q/p).

<Procedural Step 2> Authentication and Key Exchange:

(Procedural step 2-1) Perform authentication and key exchange. The DTCP method may be employed, for example.

<Procedural Step 3> Stream Transmission:

(Procedural step 3-1) Transmit an encrypted stream content (a partial MPEG-TS) between the packet transmitting device and the packet receiving device.

Although the MPEG-TS is used in the above example, this is not limitation: the applicable range of an inputted content for use in the present invention includes MPEG-TS streams such as MPEG1/2/4 (ISO/IEC13818), streams standardized by MPEG-PS(Program Stream), MPEG-ES (Elementary Stream), MPEG-PES (Packetized Elementary Stream), DV(IEC61834, IEC61883), SMPTE (Society of Motion Picture & Television Engineers) 314M (DV-based), SMPTE259M(SDI), SMPTE305M (SDTI), SMPTE292M (HD-SDI), ISO/IEC H.264, and so forth, and further, general A/V contents are also applicable.

Furthermore, file transfer of data is also included in the applicable range of inputted data used in the present invention. In the case of file transfer, content transmission faster than real time is also possible under a condition in which the data transfer speed becomes greater than a normal reproduction data rate for a content stream depending on the relationship between the processing capability of transmitting and receiving terminals and transmission delay time between the terminals.

Next, the authentication and key exchange at the procedural step 2 above is additionally described. In FIG. 5, the packet transmitting device 101 and the packet receiving device 103 are connected through an IP network. First, content protection mode information including copy protection information for a content is transmitted from the packet transmitting device 101 to the packet receiving device 103.

The packet receiving device 103 analyzes the copy protection information for the content, determines an authentication method to be used, and transmits an authentication request to the packet transmitting device 101.

Through these processes, the packet transmitting device 101 and the packet receiving device 103 share an authentication key.

Then, the packet transmitting device 101 uses the authentication key to encrypt an exchanged key, transmits the exchanged key to the packet receiving device 103, and the packet receiving device 103 decodes the exchanged key.

To make an encryption key change over time, the packet transmitting device 101 generates key change information that temporally changes, and transmits the information to the packet receiving device 103.

The packet transmitting device 101 generates an encryption key from the exchanged key and key change information, encrypts an MPEG-TS in the encryption unit using the encryption key, and transmits the MPEG-TS to the packet receiving device 103.

The packet receiving device 103 reconstructs a decoding key from the received key change information and exchanged key. The packet receiving device 103 uses this decoding key to decode the encrypted MPEG-TS signal.

In this manner, transmission of a content is performed between the packet transmitting device 101 and the packet receiving device 103 while protecting the copyright of the content on the basis of copy control.

Figure 7:
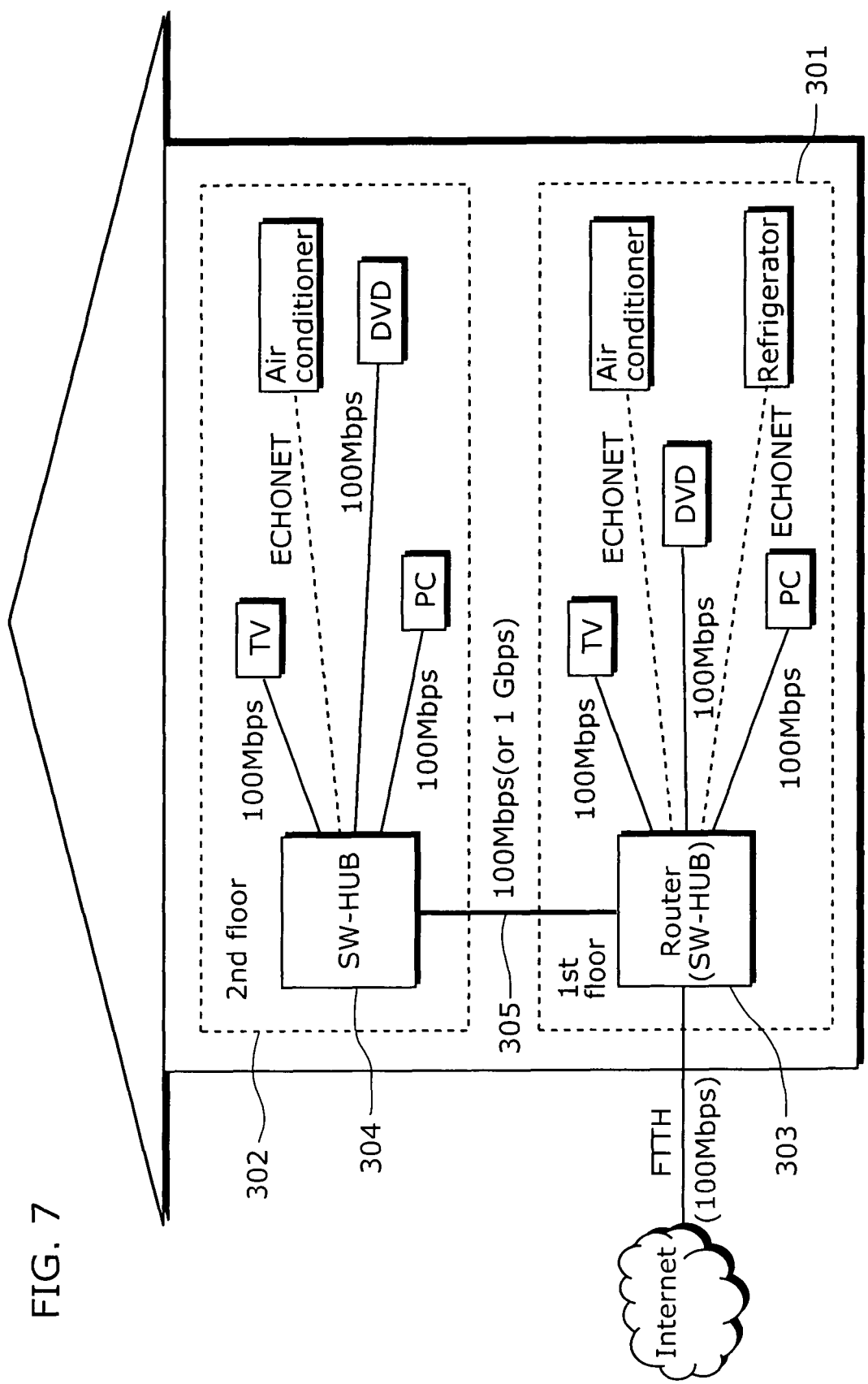
FIG. 7 is a diagram illustrating an example of a case where the present invention is applied to a general home using Ethernet™.

FIG. 7 shows an example of a case where this method is applied to a two-story house that has a LAN based on Ethernet™. This house has a network system 301 which is installed on the first floor and includes a router 303 and a network system 302 which is installed on the second floor and includes a switching hub 304. A network 305 is an Ethernet™ network for connecting between the router 303 and the switching hub 304. Here, a network system may be a subnet which is set with a subnet mask of Internet Protocol (IP). The band of all Ethernet™ networks within the house is 100 Mbps.

The network system 301 on the first floor has a configuration in which a television (TV), a personal computer (PC), and a DVD recorder are connected to the router 303 by an Ethernet™ of 100 Mbps, and an air conditioner and a refrigerator are connected to the router 303 by ECHONET.

On the second floor, a television (TV), a personal computer (PC), and a DVD recorder are connected to the switching hub 304 by an Ethernet™ of 100 Mbps, and an air conditioner is connected to the switching hub 304 by ECHONET. The ECHONET is a transmission method developed by the Echonet Consortium (hyperlink http://www.echonet.gr.jp/).

In this house, the TVs that receive a content subject to digital copyright protection from broadcasting and distribute the content to individual devices in the house (the air conditioners, DVDs, PCs, and refrigerator) as IP packets correspond to the packet transmitting device 101 of the present invention, and each of the devices corresponds to the packet receiving device 103, for example.

In FIG. 7, the personal computers (PC), DVD recorders, router 303 and switching hub 304 support IEEE802.1Q (VLAN). That is to say, when the data rate is the same (e.g., 100 Mbps) at all the respective ports of the router 303 and the switching hub 304, data inputted to an input port is all outputted to an output port without being lost inside the router (or the switching hub) unless the sum of data bands to be outputted to a specific port exceeds the specification value or actual value of the transmission rate for that port.

In the switching hub, even when data are simultaneously inputted to eight input ports, for example, the individual data are switched in a buffer of the hub without confliction and outputted from output ports as long as the output ports for the individual data are different, so that the inputted data are all outputted to the output ports without packet loss.

In FIG. 7, since the band of all Ethernets™ in the house is 100 Mbps, the band of the network 305 between the first floor and the second floor is also 100 Mbps. When a plurality of data flow among a plurality of devices on the first floor and the second floor, if there is no band limitation for each of the data, the total data rate of the data flowing over the network 305 may exceed 100 Mbps and a stream that requires real-time transmission, such as a video application in a partial MPEG-TS, may be interrupted. In this case, to prevent the interruption of a stream requiring real-time transmission, priority control among transmitted data is needed. Such a problem can be solved by introducing a speed limiting mechanism for stream transmission or file transfer, which is described below, not only in terminals but also in the router and/or the switching hub.

For example, when transmission priority for a partial MPEG-TS stream is made higher than that for file transfer data, an encrypted MPEG-TS can be transmitted in real time among the DVD recorders, PCs and TVs on the first and second floors utilizing the HTTP protocol or RTP protocol while performing file transfer between the PCs on the first floor and the second floor in background.

A partial MPEG-TS is a kind of MPEG-TS stream and is described in the ARIB standard, STD-B21, for example. Also, the overview, configuration, and operation of the HTTP protocol (IETF standards, RFC 2616 and RFC 1945) are described in "Rensai: Internet Protocol shousetsu (1), HTTP (Hyper Text Transfer Protocol), zenpen" ("Series: Details on Internet Protocol (1), HTTP (Hyper Text Transfer Protocol), first part"), an on-line material available at http://www.atmarkit.co.jp/fnetwork/rensai/netpro01/netpro01.ht ml, for example.

The transmission speed limitation mechanism for the router 303 or the switching hub 304 mentioned above can be realized by controlling data inflow. Specifically, the mechanism can be realized by comparing data of high priority with data of low priority in an inputted data queue in the router (or the switching hub) and preferentially outputting the data of higher priority. A buffer control rule for use in this priority control method includes the round robin method, fluid fair scheduling method, weighted fair scheduling method, self-synchronization fair scheduling method, WFFQ method, virtual clock scheduling method, class-based scheduling method, and so forth. Information on these scheduling methods is provided in Chapter 12 of "Network QoS gijutu ("Network QoS Techniques)", Iwao Toda, May 25, 2001 (first edition), published by Ohmsha, for example.

By transmitting attribute information of an A/V content that can be detected and extracted from a digital broadcast signal received from terrestrial broadcasting, satellite broadcasting, or over a CATV and/or the Internet between a transmitting terminal and a receiving terminal using a data exchange protocol, such as Universal Plug and Play (UPnP)-A/V and HTTP, it is possible to determine an encryption mode and a method for transmitting content attribute information for a case where an A/V content is transmitted between the transmitting terminal and the receiving terminal. Further, since a rule for adding an encryption information header can be defined, signal compatibility can be secured while maintaining the secrecy of an A/V stream between packet transmitting and receiving devices.

Standard specifications of UPnP and UPnP-A/V are disclosed at http://upnp.org. At http://upon.org, in relation to MediaServer V 1.0 and MediaRenderer V 1.0, specifications such as follows are disclosed: MediaServer V 1.0, MediaRenderer V 1.0, ConnectionManager V 1.0, ContentDirectory V 1.0, RenderingControl V 1.0, A/VTransport V 1.0, and UPnPTM A/V Architecture V 0.83, for example.

Also, in relation to the transmission of an A/V content using a network, data tapping on the network is prevented to realize data transmission of high security. This can prevent tapping and leakage of priority data (an A/V data content) which is transmitted in real time even when a public network such as the Internet is used as the transmission channel. Marketing and billing of A/V data which is transmitted over the Internet and the like is also enabled, which enables marketing and distribution of contents in B-B (B to B) and B-C (B to C) which require higher security.

Furthermore, even when an A/V content is separated from transmitted data and subjected to processing involved for transmission with hardware, general data packets which are not an A/V content can be subjected to software processing using a processor as has been conventionally done. Accordingly, by adding software, data such as management information and control information can be transmitted as general data. Since the amount of such general data which are not A/V contents is generally very small compared to A/V data as priority data, the general data can be processed by an inexpensive microprocessor such as a microcomputer, which enables realization of an inexpensive system. Since an expensive CPU or a bulk memory is not required for protocol processing for priority packets with high load and a high transmission rate either, an inexpensive and high-performance apparatus can be provided in this respect as well.

Also, a client that does not support RMP can be allowed to view a content whose viewing or copying is limited with RMPI (Rights Management & Protection Information) including billing information for use in RMP for server-based broadcasting through CNM (Copy No More) or CN (Copy Never), which can accelerate the proliferation of server-based broadcasting.

In this case, copyright managing means is employed that handles billing information, copy control information, validity period information, available reproduction count information and the like for performing reproduction control, output control or copy control of A/V data based on control information, and supplies generated information to authentication means as authentication information, and the authentication means performs authentication processing with the packet receiving apparatus based on the authentication information supplied from the copyright managing means to thereby perform reproduction control, output control, or copy control of the A/V data on the packet receiving apparatus.

The packet transmitting apparatus further includes content purchase/payment means that makes purchase and payment of a content which is subject to copyright protection with the packet receiving apparatus under control of the copyright managing means and based on billing information, reproduction control information, or copy control information.

[2] Details of a Configuration for Transmitting an A/V Stream Across an IP Network while Protecting a Copyright Next, description is given of the details of a configuration for transmitting an A/V stream across an IP network while protecting a copyright.

Figure 8:
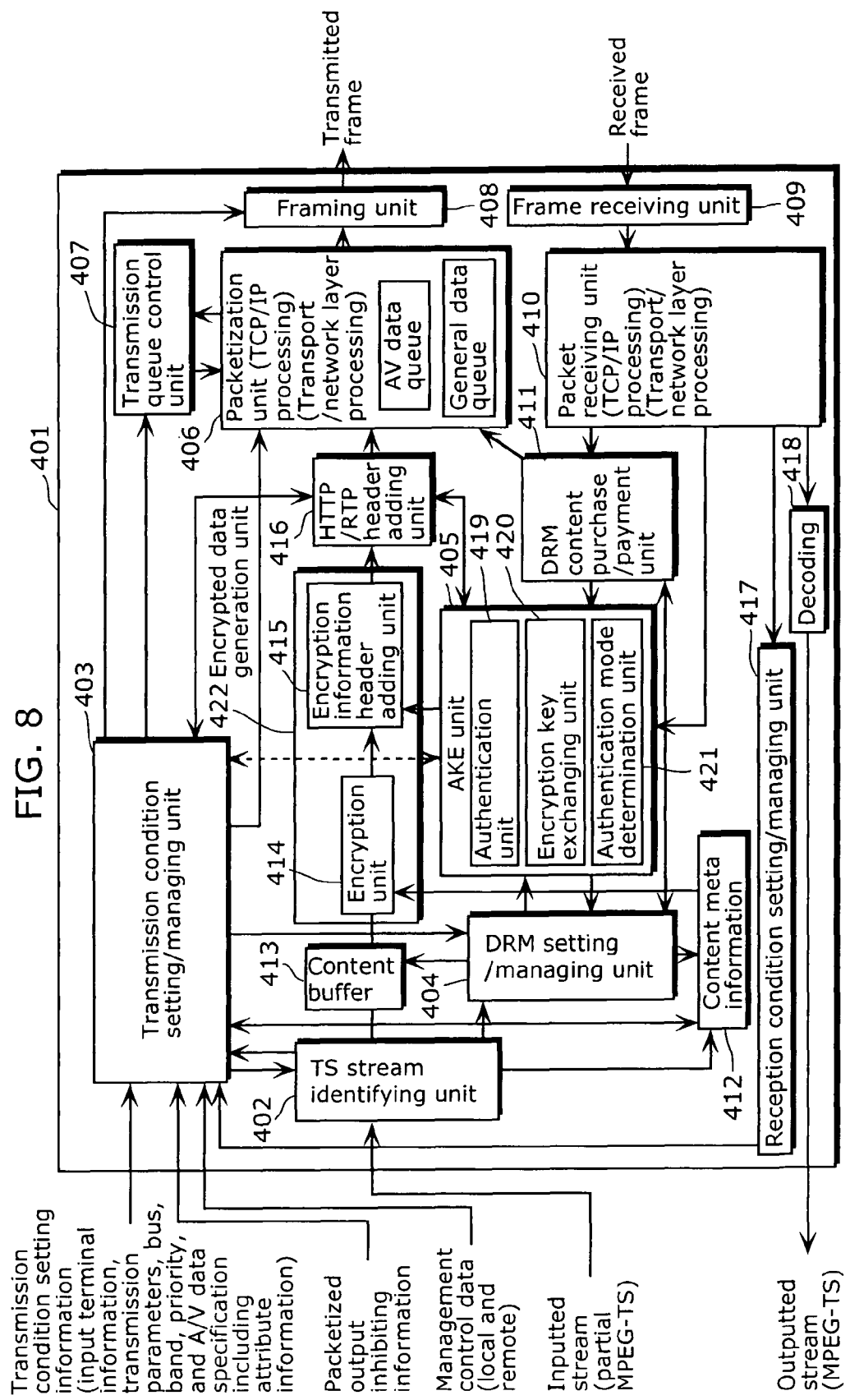
FIG. 8 is a block diagram of the packet transmitting/receiving unit according to the present invention.

FIG. 8 is a block diagram showing the functional configuration of a packet transmitting/receiving unit 401 according to the present embodiment.

This packet transmitting/receiving unit 401 is used in a packet transmitter/receiver that has both the functions of the packet transmitting device 101 and those of the packet receiving device 103 shown in FIG. 5, being represented as one of a pair of packet transmitting/receiving units that are capable of transmitting and receiving packets to and from each other. This applies to all packet transmitting/receiving units to be described hereinafter.

The packet transmitting/receiving unit 401 is an apparatus that performs transmission and reception of packets with encryption which is set based on AKE, and includes, as essential components for transmitting an A/V stream across an IP network while protecting a copyright, an AKE unit 405, a packetization unit 406, a transmission condition setting/managing unit 403, a packet receiving unit 410, an encrypted data generation unit 422, an HTTP/RTP header adding unit 416, an encrypted data decoding unit 418, a reception condition setting/managing unit 417, a framing unit 408, and a frame receiving unit 409. In the following, the functions of the individual components are described in accordance with a transmission procedure, and components other than these essential components are also described as necessary.

To the transmission condition setting/managing unit 403, non-A/V data is inputted. Inputted to the transmission condition setting/managing unit 403 as non-A/V data are, for example, input terminal information indicative of a terminal to which inputted A/V data (or transmitted data) is to be inputted, data format information indicative of the data format of A/V data, A/V data information including attribute information indicative of the attributes of A/V data, and information for controlling transmission.

More specifically, the information for transmission control may be transmission condition setting information, such as the type of the transmitted data, information on a destination address and a port number, information on a path for use in transmission (routing information), the band of the transmitted data, and transmission priority of the transmitted data, management control data for devices in the transmitting unit (i.e., local) and the receiving unit (i.e., remote), data for feeding back reception conditions to the sending side, and so forth.

The transmission condition setting/managing unit 403 determines which of TCP or UDP to use for transmitting A/V data based on these pieces of inputted information, and controls generation of headers and/or payload data (by parameter setting and the like) in the packetization unit 406 and/or the framing unit 408 in accordance with the determined protocol, and also generates encryption mode information that indicates an encryption mode for use during the transmission of the A/V data.

When A/V data as a signal to be handled is an MPEG-TS signal, for example, the input terminal information that indicates a terminal to which A/V data (transmitted data) is inputted on the packet transmitting/receiving unit 401 identifies (1) an input terminal for digital broadcasting (in Japan, an RF input terminal compatible with terrestrial digital broadcasting, BS digital broadcasting, and 110-degree wideband CS digital broadcasting), (2) IEEE1394 D-I/F, (3) USB-I/F, (4) IP-I/F (identification of an Ethernet™ and/or a wireless LAN), (5) analog video/audio input (in this case, inputted analog video/audio is converted to an MPEG-TS signal in the packet transmitting/receiving unit 401), and the like. For digital broadcasting, a commentary article is provided in the *gakkaishi* (a journal) of Institute of Image Information and Television Engineers, Vol. 58, No. 5, pp. 604 to 654, for example.

When A/V data as a signal to be handled is a partial MPEG-TS, for example, the data format information indicative of the data format of A/V data in the packet transmitting/receiving unit 401 represents the MIME-Type or media format of the partial MPEG-TS. For example, the transmitting unit (the server) and the receiving unit (the client) define media formats for a still picture medium, a music medium, and a moving picture medium they handle. For example, media formats for moving pictures (video) include MPEG2, MPEG1, MPEG4, WMV, and so forth. Also, media formats for still pictures include JPEG, PNG, GIF, TIFF and so forth. Further, media formats for music include Linear PCM, AAC, AC3, ATRAC3plus, MP3, WMA, and so forth. Such formats are similarly defined by the DLNA (Digital Living Network Alliance, the web site is at www.dlna.org) as well, for example. The DLNA Guideline, Version 1.0 refers to a server (the transmitter of a content, the source in DTCP) as a DMS (Digital Media Server) and a client (the receiver of a content, the sink in DTCP) as a DMP (Digital Media Player). The DMS is composed of a Media Server (MS) and a Control Point (CP) of UPnP-A/V, and the DMP is composed of a Media Renderer (MR) and a Control Point (CP) of UPnP-A/V. The MS, MR and CP of UPnP-A/V are described in the web site of UPnP, www.upnp.org.

In the case of a video media format, the data format information includes, as additional parameters, (1) identification of resolution (SD, HD), (2) identification of a TV system (for analog, NTSC, PAL, and SECAM, and for digital, broadcasting systems such as ATSC of the US, DVB in Europe, and Japan's ISDB based on the ARIB standard), (3) presence/absence of additional information such as a timestamp format, and the like. In the case of video, for example, since its MIME-Type is "mpeg/video" for both MPEG-PS and MPEG-TS, more detailed handling and control of a video medium is enabled by use of such additional information as shown above.

An outline of the ARIB standard pertaining to digital broadcasting is provided in Matsushita Technical Journal, February 2004, Vol. 50, No. 1, pp. 7 to 12, for example.

When A/V data as a signal to be handled is an MPEG-TS signal which is broadcast by a broadcasting station through a terrestrial digital broadcasting system in Japan and tuned on a receiver in a home and the like (to be exact, a partial transport signal (partial TS signal) which is defined as an inputted/outputted transport stream for a serial interface in Chapter 9 of the ARIB standard, ARIB STD B21), for example, the attribute information indicative of the attributes of A/V data in the packet transmitting/receiving unit 401 include a channel name (the name of the broadcasting station), a channel number, a program title, a program category, a scheduled start time of broadcasting, a scheduled end time of broadcasting, information on the contents of the program, the resolution of the program, viewing limiting information such as parental control, copy control information, a viewing charge, and the like, which are transmitted by the broadcasting station as PSI/SI information. The PSI and SI are defined in ARIB technique materials, ARIB TR-B14 and ARIB TR-B15.

The AKE unit 405 internally has an authentication unit 419 and an encryption key exchanging unit 420. The AKE unit 405 acquires setting information on authentication and key exchange (AKE setting information), and outputs information relating to the AKE setting information, e.g., copy protection information and encryption key change information, to the packetization unit 406.

The authentication unit 419 executes authentication processing by verifying that the packet transmitting apparatus and the packet receiving apparatus have predetermined conditions. The encryption key exchanging unit 420 has an encryption key be shared between the packet transmitting apparatus and the packet receiving apparatus after authentication processing, and updates the encryption key with input terminal information, data format information, attribute information, and transmission conditions that are generated from billing information, copy control information, validity period information, and available reproduction count information. The encrypted data generation unit 422 encrypts A/V data using the encryption key.

The HTTP/RTP header adding unit 416 adds information relating to AKE setting information sent from the AKE unit 405 as a TCP/IP header in accordance with transmission parameters sent from the transmission condition setting/managing unit 403, and sends it to the packetization unit 406.

The packetization unit 406 queues A/V data and general data separately, and sends the individual data to the framing unit 408 in consideration of A/V data latency.

The authentication unit 419 has an authentication execution mode in which authentication is performed between the packet transmitting apparatus and the packet receiving apparatus and an authentication non-execution mode in which authentication is not performed, and the encrypted data generation unit 422 can be controlled to add an encryption information header based on encryption mode information generated by the transmission condition setting/managing unit 403 whether the authentication means is in the authentication execution mode or in the authentication non-execution mode.

In this case, the encrypted data generation unit 422 can be controlled to add copy control information as an encryption information header when the copy control information indicates that copy control is to be implemented, and not to add the copy control information as the encryption information header when copy control information indicates that copy control is not to be implemented.

Further in this case, the authentication unit 419 can also perform authentication with the packet transmitting/receiving unit included in the packet receiving apparatus based on input terminal information, data format information, and authentication conditions which are generated from attribute information, billing information, copy control information, validity period information, and available reproduction count information. Here, the packet transmitting/receiving unit 401 further includes access position notifying means which notifies the packet receiving apparatus of control authentication information which is composed of data format information, attribute information, and at least one of billing information, copy control information, validity period information, and available reproduction count information as a list of the programs in the form of URI information that specifies an access position for each program of A/V data or URI information which is extended with Query.

Also, the packet transmitting apparatus further includes access position notifying means that, upon receipt of a request for transmitting a program list from the packet receiving apparatus, notifies the packet receiving apparatus of control authentication information which is composed of data format information, attribute information, and at least one of billing information, copy control information, validity period information, and available reproduction count information as the program list in the form of URI information that specifies an access position for each program of A/V data or URI information that is extended with Query.

Also, the packet transmitting apparatus further includes an access position notifying means that, when copy control information for a unit program of A/V data indicates that copy control is not to be implemented, generates two MIME-Types including a first MIME-Type that represents data format information for the A/V data and a second MIME-Type that represents data format information for data which is the A/V data having the encryption information headers added thereto intermittently, and presents information on two extended URIs specifying an access point for each program of A/V data to the packet receiving apparatus.

Also, the information on two URIs is used for specifying URIs for "res" in Universal Plug and Play (UPnP), and the two MIME-Types identify a content by being inserted in the third field of protocolInfo, which is an attribute of the res.

The packetization unit 406 may also be characterized in that it, when Transmission Control Protocol (TCP) is determined as the transmission protocol for A/V data by the transmission condition setting/managing unit 403, makes a TCP connection a perpetual connection to perform the transmission. Further, the authentication means is characterized in that it performs authentication and key exchange for sharing an encryption key with the packet receiving apparatus in accordance with the Digital Transmission Content Protection (DTCP) method.

When performing paketization in accordance with HTTP, the packetization unit 406 performs packetization with a range request or a data acquisition command. When A/V data on the sending side is MPEG, the packetization unit 406 performs the packetization with reference to at least one piece of information out of time-based discontinuity occurrence information or continuity information in an MPEG stream, position information for an MPEG I picture, P picture, or B picture within a file of A/V data, time information for an MPEG I picture, a P picture, or a B picture, or the respective numbers or the total number of P pictures and B pictures that are present between a certain I picture and the next I picture.

Also, as position information or time information for an MPEG I picture, P picture, or B picture within a file of A/V data, the packetization unit 406 generates I-picture, P-picture, or B-picture position information or time information which is common among a number of different formats from position information or time information for a plurality of I pictures, P pictures, or B pictures which is originally provided even when the A/V data are of a number of different formats, and using the common I-picture, P-picture, or B-picture position information or time information, performs the packetization with reference to the position information or time information for an MPEG I picture, P picture, or B picture within the file of the A/V data.

Also, when performing packetization in accordance with HTTP, the packetization unit 406 performs the packetization by a chunk transmission method, and performs the packetization so that the payload length of an HTTP packet is of a value determined by the packet transmitting apparatus.

Also, when performing packetization in accordance with HTTP, the packetization unit 406 performs the packetization so that the payload length of the HTTP packet is the length of data composed of an encryption information header and an integer number of Transport Streams (TS) that make up the A/V data, or the length of data that is composed of an encryption information header and an integer number of time-stamped TSs.

The packetization unit 406 may also use a range request method in addition to the chunk transmission method for transmission by HTTP by switching between the methods.

In that case, as HTTP transmission, when the output of the packet transmitting apparatus is a received signal for live broadcasting, switching of a reception channel for live broadcasting, or a reproduction signal at the time of or selecting an accumulated program, the packetization unit 406 performs chunk transmission, and when the output is a reproduction signal from a program reproduced from an accumulation medium after program selection, the packetization unit 406 uses the range request, performing reproduction by switching between those transmission methods.

The packetization unit 406 may also transmit the A/V data switching between transmission by HTTP and transmission by RTP which has smaller overhead of the amount of transmitted data, which can realize more detailed reproduction control.

The framing unit 408 further adds a MAC header to an IP packet outputted from the packetization unit 406 in accordance with transmission parameters sent from the transmission setting/managing unit 403 to thereby convert the packet into an Ethernet™ frame, and outputs the frame to the network as a transmitted frame.

On the receiving side, the frame receiving unit 409 receives a signal (frames) inputted from the network filtering the signal based on the MAC header, and passes it as IP packets to the packet receiving unit 410. Since the MAC address of a device is not transmitted across a Subnet boundary in a router in a general Ethernet™ system, the range of IP packet transmission can be confined within the Subnet of an IP address by registering the MAC addresses of transmitting and receiving devices in advance and identifying the other party of communication based on the MAC addresses.

The packet receiving unit 410 applies filtering to IP packets sent from the frame receiving unit 409 by identifying IP packet headers and the like, and outputs IP packets to the AKE unit 405. As a result, the AKE unit of the sending side and the AKE unit of the receiving side are connected via a network, so that they can exchange messages with each other via a communication protocol. That is, authentication and key exchange are performed in accordance with a procedure set in the AKE units.

Once authentication and key exchange succeed between the sending side and the receiving side, encrypted A/V data is transmitted.

Now, in transmission processing in the packet transmitting/receiving unit 401 shown in FIG. 8, a partial MPEG-TS signal is inputted to the TS stream identifying unit 402, in which the type of the stream is identified. Thereafter, the signal is placed in a content buffer 413 to undergo adjustment of encryption timing, and then inputted to the encrypted data generation unit 422.

In some cases, the encryption information header adding unit 415 adds an encryption information header based on encryption mode information generated by the transmission condition setting/managing unit 403 regardless of whether copy control information indicates that copy control is to be implemented or copy control is not to be implemented.

As a partial MPEG-TS, a partial MPEG-TS constituting a broadcast program (or program) is extracted from a full TS which is sent from a broadcasting station upon receipt and channel selection of digital broadcasting which is distributed terrestrially, via a satellite, CATV, or optical fiber in Japan on a digital broadcasting tuner, for example. PSI/SI multiplexed on a partial MPEG-TS include a PAT, a PMT, a DIT, and an SIT (see the ARIB standard, STD-B21, for example), and a PAT contains a DTCP descriptor. Also, the DTCP descriptor contains analog copy control information and digital copy control information.

For example, when both digital copy control information for the PMT first loop and digital copy control information for the PMT second loop are present in digital copy control information for a certain program on a certain channel, the digital copy control information for the PMT second loop is preferentially set as the digital copy control information for that program. When only either one of digital copy control information for PMT fist loop and digital copy control information for PMT second loop is present, the digital copy control information that is present is set as the digital copy control information for the program.

Also, when externally inputted information or packet data transmission permitting information that is inputted to the transmission condition setting/managing unit 403 being multiplexed on PSI/SI indicates "permission", packets are outputted. On the other hand, when the packet data transmission permitting information indicates "inhibition", i.e., the opposite of permission, packets are inhibited even when any other condition indicates permission. This packet data transmission permitting information is shown in the figure as packetized output inhibiting information, which represents the same meaning with the opposite logic. The packet data transmission permitting information is inserted to the PMT first loop or PMT second loop of a partial MPEG-TS as a packet data transmission permission descriptor, for example. The packet data transmission permission descriptor may essentially be one bit.

When digital copy control information for the PMT second loop is now COG (Copy One Generation, permitting only one-generation copying) in the digital copy control information for a certain program on a certain channel, the encryption unit 414 in the encrypted data generation unit 422 encrypts a partial MPEG-TS signal. Further, the encryption information header adding unit 415 adds an EMI representing the COG mentioned above and AKE information such as seed information (information of one or more bits) sent from the AKE unit 405 as an encryption information header to the signal, and outputs the signal to the packetization unit 406.

When the digital copy control information for the PMT second loop now indicates CF (Copy Free, i.e., copying allowed) in the digital copy control information for a certain program on a certain channel, the encryption unit 414 in the encrypted data generation unit 422 does not encrypt a partial MPEG-TS signal. Further, the encryption information header adding unit 415 adds EMI (encryption mode information) representing the CF mentioned above and AKE information such as seed information (information of one or more bits) sent from the AKE unit 405 as an encryption information header, and outputs the signal to the packetization unit 406.

Here, when there is external control not to add an encryption information header, an encryption information header is not added.

Also, packet data transmission permitting information which is externally inputted or inputted being multiplexed on PSI/SI is included. For example, packet data transmission permitting information is included in a digital copy control descriptor (see ARIB TR-B-14, Parts 2 and 4, for example) provided in the first loop or second loop of a PMT for an MPEG-TS. In this case, modification to the equipment of the sending side, e.g., a broadcasting station, is involved.

As has been described above, whether to execute encryption or not and whether to add an encryption information header or not are configured to be uniquely determined by a condition which is determined by copy control information for a partial TS and external input and/or internal settings.

The packetization unit 406 adds a TCP/IP header to data outputted from the encrypted data generation unit 422 by use of parameters such as transmission conditions from the transmission condition setting/managing unit 403, and sends the data to the framing unit 408. The framing unit 408 adds a MAC header to an IP packet from the packetization unit 406 using the 802.1Q (VLAN) method to thereby convent it to an Ethernet™ frame, and outputs the frame to the network as a transmitted frame. Here, by setting high Priority (user priority) in TCI (Tag Control Information) within the MAC header, priority for network transmission can be made higher than general data.

Figure 10:
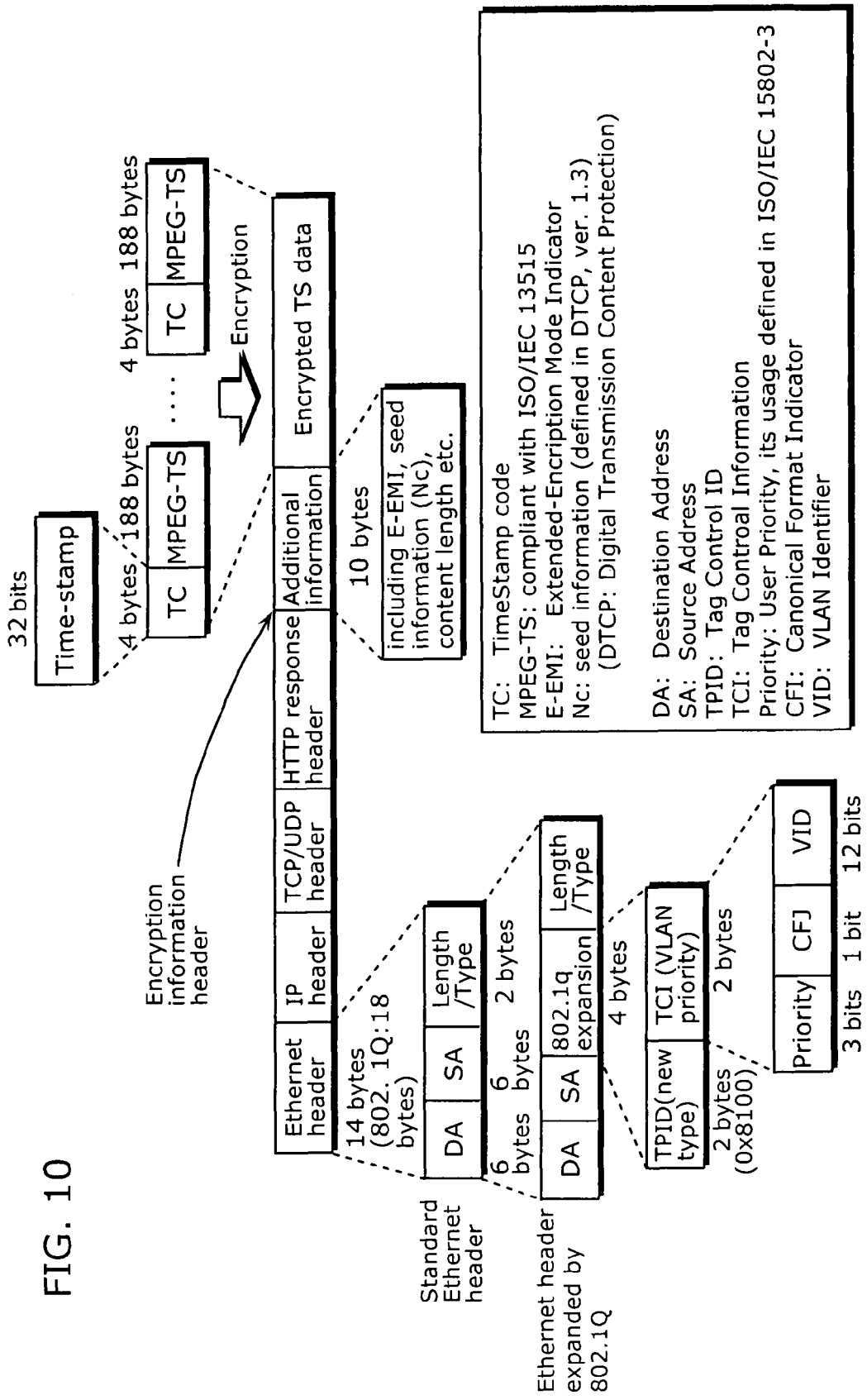
FIG. 10 shows an example of an Ethernet™ frame structure specification for an MPEG-TS according to the present invention.

FIG. 10 shows an example of an Ethernet™ frame for a case where an encrypted partial MEPG-TS is transmitted by HTTP/TCP/IP/Ethernet™. Here, a 4-byte timestamp is added as a header to a partial MPEG-TS packet (188 bytes). This 4-byte timestamp is sampled at a clock of 27 MHz.

On the receiving side, a signal inputted from the network is filtered by the frame receiving unit 409 based on MAC headers, and inputted to the packet receiving unit 410 as IP packets. The packet receiving unit 410 performs packet filtering by identifying packet headers and the like, and the packets are inputted to the encrypted data decoding unit 418. The encrypted data decoding unit 418 detects an encryption information header and extracts EMI (encryption mode information) to perform decryption, and outputs a decrypted partial MPEG-TS signal. Here, since the original copy control information for the partial MPEG-TS signal is present in a PMT, the copy control information has been correctly passed from the sending side to the receiving side.

To the transmission condition setting/managing unit 403, data for feeding back reception conditions to the sending side is inputted via the reception condition setting/managing unit 417, and the transmission condition setting/managing unit 403 sets a header and payload data to be generated by the packetization unit 406 for IP packets and the framing unit 408 for Ethernet™ frames.

Figure 9:
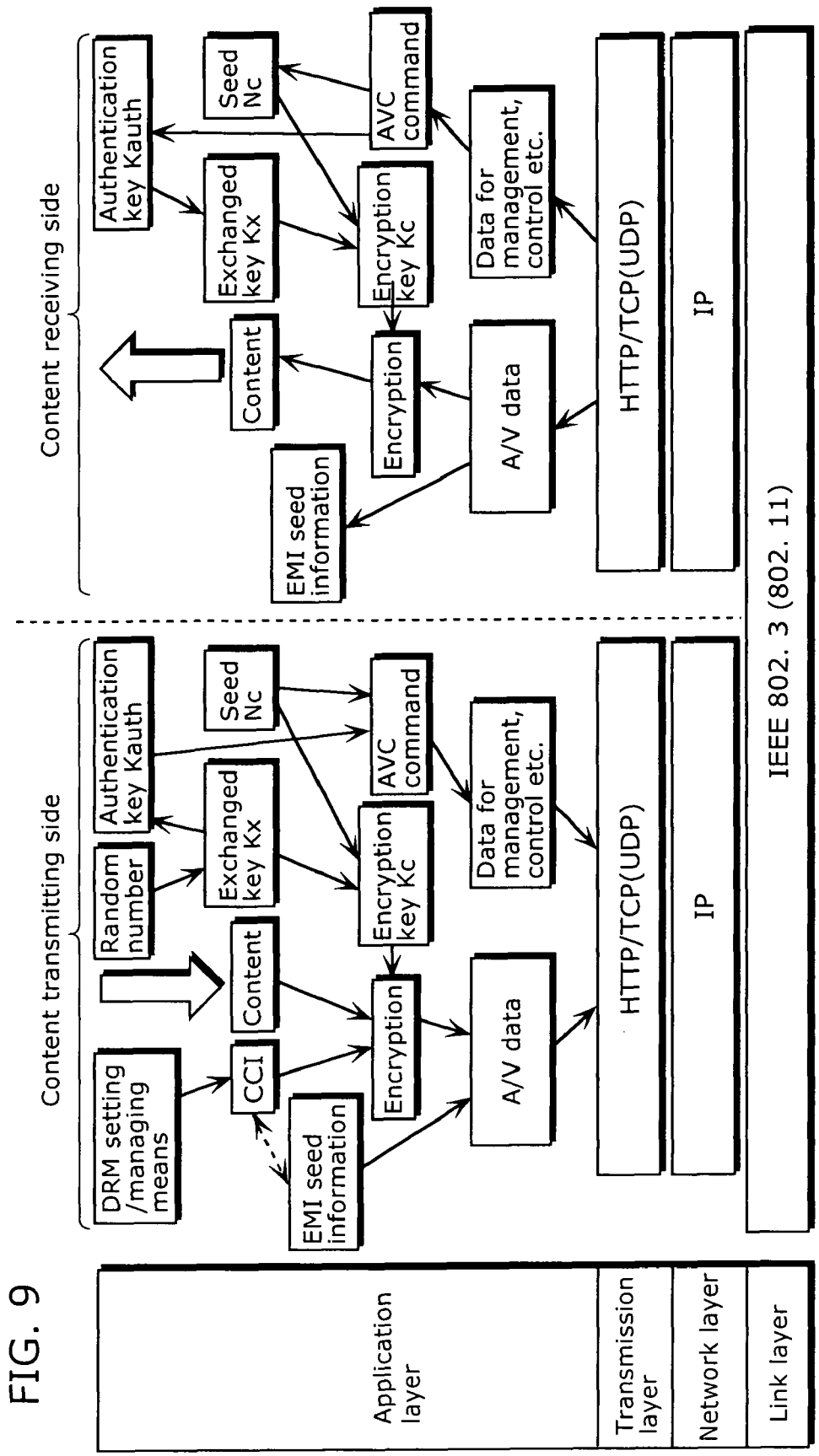
FIG. 9 is a diagram illustrating the procedure of content transmission according to the present invention in a case where the DTCP method is applied to authentication and key exchange.

Now, using a protocol stack shown in FIG. 9, the above-described procedure is additionally described. First, on the content sending side illustrated in FIG. 9, an encrypted content and protection mode information for the content are transmitted from the content sending side to the content receiving side. The receiving side analyzes the copy protection information for the content, determines an authentication method, and sends an authentication request to the packet transmitting device. Then, the sending side generates a random number, and inputs the random number to a predetermined function to create an exchanged key. The sending side inputs information on the exchanged key into a predetermined function to generate an authentication key. The receiving side also seeks to share the authentication key through predetermined processes. The encryption information used here is information that is generated by combining one or more of information specific to the sending side (e.g., a device ID, authentication information for the device, a MAC address), a secret key, a public key, externally given information and the like, for example, and robust encryption is possible by using an encryption method of high encryption strength, such as DES and AES methods. Then, the sending side encrypts the exchanged key using the authentication key and transmits the key to the receiving side, which decodes the exchanged key. The receiving side also inputs the exchanged key and initial key update information to a predetermined function to generate an encryption key. To make the encryption key change over time, the sending side generates key update information that temporally changes, and sends the information to the receiving side. An MPEG-TS representing the content is encrypted with the encryption key. Then, TCP packets are generated with A/V data which is the encrypted MPEG-TS as payload for TCP (or UDP) packets. The TCP packet is further used as data payload of an IP packet, and an IP packet is generated. The IP packet is further used as payload data of a MAC frame, and an Ethernet™ MAC frame is generated. For MAC, not only IEEE802.3, which is Ethernet™, but MAC of IEEE802.11, which is a wireless LAN standard, is also applicable.

Now, the Ethernet™ MAC frame is transmitted over an Ethernet™ from the sending side to the receiving side. On the receiving side, a decoding key is generated in accordance with a predetermined procedure. Then, IP packets are filtered out of the received Ethernet™ MAC frame. TCP (or UDP) packets are further extracted from the IP packets. Then, A/V data is extracted from the TCP (or UDP) packets, and an MPEG-TS (i.e., the content) is decoded with the decoding key reconstructed from the exchanged key and key change information, and the MPEG-TS is outputted.

As has been described above, according to the present embodiment, an A/V stream such as a partial MPEG-TS signal can be encrypted and converted into IP packets on a packet transmitting device and transmitted over a network, and can be decoded into the original signal on an IP packet receiving device.

In FIG. 7, by devising a network topology that uses a switching hub, stream transmission and file transfer can be allowed to coexist. For example, by expanding the band of the network 305 between the first floor and the second floor from 100 Mbps, which was shown in the Background Art, to 1 Gbps, an encrypted MPEG-TS can be transmitted in real time among the DVD recorders, PCs, and televisions on the first floor and second floor while file transfer is performed in background between the PCs on the first floor and the second floor. For instance, using a commercially available switching hub having eight 100-Mbps ports and one 1-Gbps port, the 1-Gbps port is connected to the network 305 connecting the first floor and the second floor and A/V devices such as televisions are connected to the remaining eight ports of 100 Mbps. Since there are eight 100-Mbps ports, even if data to the eight ports are each inputted at a maximum of 100 Mbps and outputted to the 1-Gbps port, the data inputted from the eight ports are all outputted to the 1-Gbps port without being lost inside the switching hub because 100 Mbps×8 channels=800 Mbps, which is smaller than 1 Gbps. Accordingly, any data occurring on the first floor can be transmitted to the second floor. Furthermore, in the counter direction, any data occurring on the second floor can also be transmitted to the first floor. In such a way, when a switching hub is used, stream transmission and file transfer can be allowed to coexist by devising a network topology.

In FIG. 8, the AKE unit 405 internally has an authentication mode determination unit 421. A TCP port number for authentication is inputted to the AKE unit 405 as AKE setting information, and to the transmission condition setting/managing unit 403 as management control data. Here, the TCP port information for authentication is given using the mechanism of UPnP-A/V in the form of a URI specifying an access position for each content or each broadcasting channel, or URI information which is extended with Query. Here, URI information for a content is mapped to the main data portion of a URI, and authentication information for the content is mapped to the Query portion. Here, it is possible to make mode settings such that transmission of the content does not require authentication when there is no Query portion and transmission of the content requires authentication when there is a Query portion. Examples of a URI and a Query can be given in the format below, for example.

<service>://<host>:<port>/<path>/
<filename>.<>ext>?AKEPORT=<port2> where <host>:<port>/<path>/<filename>.<ext> represents the URI and the file name of an A/V content, and <port2> in the Query portion following the "?" represents a port number for authentication. However, this is a case where the IP address of an authentication port is the same as the IP address of the A/V content.

The sending side supplies authentication execution mode information to the receiving side with this URL and Query. The receiving side receives the URI and Query information using a Web browser or a Content Directory Service (CDS) for UPnP-A/V, and the authentication mode determination unit 421 can determine an authentication mode.

It is also possible to conceive a variation of the packet transmitting/receiving unit 410 so as to accumulate and maintain partial MPEG-TS data and the like.

Figure 11:
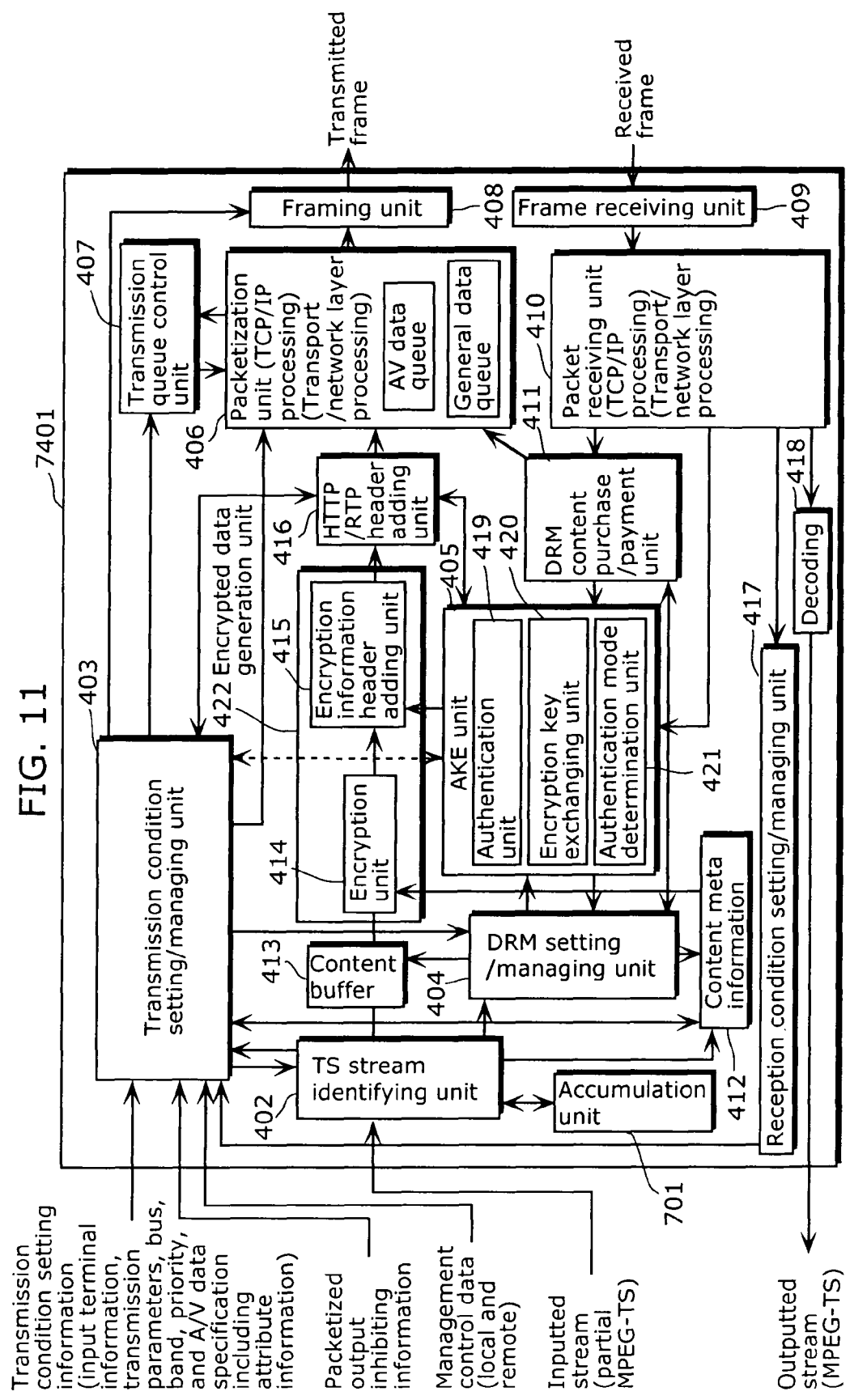
FIG. 11 is a block diagram of the packet transmitting/receiving unit according to the present invention.

FIG. 11 is a block diagram showing the configuration of a packet transmitting/receiving unit 7401 in this variation. In FIG. 11, the packet transmitting/receiving unit 7401 has an accumulation unit 701 which is connected to the TS stream identifying unit 402. This configuration allows the transmission condition setting/managing unit 403 to receive A/V data from both a broadcasting source and an accumulation source.

Here, description is advanced keeping in mind that two types, i.e., broadcasting and accumulation, are possible as input source information for A/V data which is inputted to the transmission condition setting/managing unit 403, and the accumulation unit 701 is described in detail later anew.

The transmission condition setting/managing unit 403 extracts necessary data for input source information (broadcasting or accumulation) of inputted A/V data, and outputs the data to the encrypted data generation unit 422. Then, the encryption information header adding unit 415 in the encrypted data generation unit 422 adds the necessary data sent from the transmission condition setting/managing unit 403 as an encryption information header in the following manner.

As input source information (broadcasting or accumulation) for A/V data inputted to the transmission condition setting/managing unit 403, such cases as follows are possible, for example:

(Case 1) A case where the A/V data is a content which is received on a broadcasting channel that broadcasts copy-free contents. Examples of such a broadcasting channel include VHF and UHF, which are analog broadcasting, or broadcasting channels for BS analog broadcasting, for example.

(Case 2) A case where the A/V data is a content which is received on a broadcasting channel that broadcasts contents which are not copy-free even for a limited time period.

Examples of such broadcasting channels include pay channels for BS digital broadcasting and pay channels of CATV broadcasting, for example. Copy control information for a broadcasting channel that broadcasts contents which are not copy-free even for a limited time period is characterized in that it switches among Copy Never, Copy One Generation, and Copy Free with an EPN (Encryption Plus Non-assertion) flag over time in accordance with what is being broadcast.

Here, reception of a broadcasting channel that broadcasts contents which are not copy-free even for a limited time period can be controlled to be done when a receiving apparatus or a receiving user is verified to be an authorized one by the authentication unit with a business that provides broadcast distribution. An example of this authentication can be authentication using a security module such as a BS-Conditional Access Systems (B-CAS) card for Japanese digital satellite broadcasting or a POD card used for CATV broadcasting in the United States.

Also, addition of an encryption information header is controlled in the following manner, for example. To be specific, an encryption information header is not added when a broadcasting channel which broadcasts copy-free contents is received. An encryption information header is added when a broadcasting channel that broadcasts contents which are not copy-free even for a limited time period is received. Further, an encryption information header is not added when A/V data is a content of a copy-free title reproduced from an accumulation medium. An encryption information header is added when A/V data is a content of a non-copy-free title reproduced from an accumulation medium. When an encryption information header is added on the sending side, a Content-Length which is the length of the transmitted data plus the length of the encryption information header is described in an HTTP response header.

By controlling addition of an encryption information header in the above-described manner, CCI (copy control information) for an A/V content set by a copyright holder can be passed also in network transmission. Further, by sharing the same the rule for controlling the addition of an encryption information header between the sending side and the receiving side, operational compatibility among different device models can be secured.

Now, description is given of a configuration for allowing a client not supporting RMP to view a content whose viewing or copying is limited with RMPI including billing information and the like for use in RMP for server-type broadcasting by way of CNM (Copy No More) and/or CN (Copy Never).

Based on copyright management information for a content represented as content meta information 412, a DRM setting/managing unit 404 generates authentication information based on billing information, copy control information, validity period information, available reproduction count information, and the like for performing reproduction control, output control, or copy control of A/V data, and notifies the AKE unit 405 of the authentication information.

The AKE unit 405 performs authentication processing with the packet receiving apparatus based on the authentication information notified from the DRM setting/managing unit 404, thereby performing reproduction control, output control, or copy control of the A/V data on the packet receiving apparatus.

Further, a DRM content purchase/payment unit 411 may perform purchase and payment of a content subject to copyright protection with the packet receiving apparatus under control of the DRM setting/managing unit 404 and based on billing information, reproduction control information, or copy control information.

Now, in FIG. 8, operations of a transmission queue control unit 407, an A/V data queue, and a general data queue is described.

AKE setting information is inputted to the AKE unit 405, and information relevant to the AKE information (e.g., copy control information and encryption key change information), as well as transmission condition setting information, such as the type of transmitted data, information on the destination address or a port number, information on a path for use in transmission (routing information), the band of the transmitted data, and the transmission priority of the transmitted data, management control data for devices in the transmitting unit (local) and the receiving unit (remote), and data for feeding back reception conditions to the sending side are inputted from the transmission condition setting/managing unit 403 to the packetization unit 406. In the packetization unit 406, the information and data are subjected to TCP/IP processing, and inputted to the general data queue.

On the sending side, an MPEG-TS signal is inputted to the encrypted data generation unit 422, in which the MPEG-TS signal is encrypted. Thereafter, the encrypted MPEG-TS signal is inputted to the packetization unit 406 in which the signal is subjected to TCP/IP processing, and inputted to the A/V data queue.

The transmission queue control unit 407 controls data to output preferentially when data are present in the A/V data queue and the general data queue. In a normal condition, content data such as an MPEG-TS is controlled to be outputted preferentially over general data. When an MPEG-TS is transmitted with low latency (low delay) between packet transmitting and receiving devices, for example, overflow is likely to occur because a buffer for MPEG-TSs is also small.

When the MPEG-TS buffer is about to overflow on the sending side, or when reference to information fed back from the receiving side shows that the MPEG-TS buffer of the receiving side is about to underflow, breakdown of the buffer can be avoided by adaptively further increasing the priority of the A/V data queue so as to preferentially output MPEG-TS data.

However, to speed up the device control response of the receiving device (a remote device) such as reproduction and pause, the priority of the general queue can be adaptively increased, but this can cause the overflow or underflow of the MPEG-TS buffer described above.

Another way to speed up device control response, such as reproduction and pause, of the receiving device (the remote device) while avoiding buffer overflow or underflow is to only and exceptionally output device control packets directly to the framing unit 408 bypassing the A/V data queue and the general data queue, thereby realizing prompt control response. Alternatively, a prompt control response is realized by a method which provides a new queue for device control packets. The operation of the receiving side is as mentioned above.

Further, in FIG. 8, the packetization unit 406 internally has a first packetization unit and a second packetization unit, and the packet receiving unit 410 internally has a first packet receiving unit and a second packet receiving unit. In this case, AKE setting information is inputted to the AKE unit 405, and information relevant to the AKE information (e.g., copy control information and encryption key change information), as well as transmission condition setting information, such as the type of transmitted data, information on the destination address or a port number, information on a path for use in transmission (routing information), the band of the transmitted data, and the transmission priority of the transmitted data, management control data for devices in the transmitting unit (local) and the receiving unit (remote), and data for feeding back reception conditions to the sending side are inputted to the first packetization unit. In the first packetization unit, the information and data are subjected to TCP/IP processing through software processing using a processor, and inputted to the general data queue.

On the sending side, an MPEG-TS signal is inputted to the encrypted data generation unit 422, in which the MPEG-TS signal is encrypted into an MPEG-TS signal. Thereafter, the encrypted MPEG-TS signal is inputted to the packetization unit 406, subjected to HTTP/TCP/IP processing through processing using a hardware accelerator, and inputted to the A/V data queue. When data are present in both the general data queue and the A/V data queue, the transmission queue control unit 407 performs priority control for data output from the two queues as in the above case.

Now, on the receiving side, IP packets are filtered for a signal inputted from the network based on MAC headers in the frame receiving unit 409. Here, an IP packet outputted from the first packetization unit is inputted to the first packet receiving unit and an IP packet outputted from the second packetization unit is inputted to the second packet receiving unit. The first packet receiving unit performs reception processing for TCP/IP through software processing to the IP packet using a processor, and outputs the IP packet to the AKE unit 405 or the reception condition setting/managing unit 417. Also, the second packet receiving unit performs reception processing for HTTP/TCP/IP to the IP packet through processing using a hardware accelerator, and inputs the IP packet to the encrypted data decoding unit 418. Then, decryption is performed in the encrypted data decoding unit 418, and an MPEG-TS is outputted.

As a result, not only an MPEG-TS signal can be encrypted and transmitted in real time between packet transmitting and receiving devices, but, because the second packetization unit which is exclusively used for transmission processing for MPEG-TSs is composed of a hardware-based accelerator, omission in transmitting outgoing packets or receiving incoming packets, which intrinsically result from software processing, does not occur. This can completely transmit all the priority data packets and enable transmission of high-quality video with realtimeness guaranteed. Also, general data is temporarily accumulated in a buffer unit, and intermittently transmitted while priority data transmission is preferentially performed. In addition, the first packetization unit with a small data capacity can be processed with an inexpensive processor, such as a microcomputer.

Furthermore, by way of hardware processing, an Ethernet™ frame can be received and an IP header for the third layer of the OSI reference model and a UDP header for the fourth layer of the OSI reference model can be checked simultaneously also in reception processing. By separating MPEG-TS packets from general data packets and processing the MPEG-TS packets with hardware, it is possible to realize high-quality reception that prevents omission in reception of received frames and guarantees realtimeness.

When timing of packet transmission or the rate of transmitting data from the two transmission data queues is controlled with hardware, not software, perfect transmission control in units of clocks is possible. This can transmit all the priority packets completely to enable high-quality transmission with realtimeness guaranteed. In addition, since shaping of outputted packets is exactly performed in units of clocks, high-quality transmission is enabled with a very small probability of occurrence of packet discarding in the first-stage router or the switching hub.

In the description so far, the transmission condition setting/managing unit 403 represents an example of A/V data information acquisition means, transmission condition setting managing means, and transmission protocol determination means, the TS stream identifying unit 402 represents an example of data input means, the encrypted data generation unit 422 represents an example of encrypted transmitted data generating means, the HTTP/RTP header adding unit 416 and the packetization unit 406 represent examples of packetization means, the AKE unit 405 represents an example of authentication means, and the framing unit 408 represents an example of transmission means.

[3] Details of a Configuration for Transmitting a Specified Portion of an Accumulated A/V Stream Now, description is given of details of a configuration for transmitting a specified portion of an accumulated A/V stream.

FIG. 11 is a block diagram showing the configuration of the packet transmitting/receiving unit 7401 to be used in this description. This packet transmitting/receiving unit 7401 has an accumulation unit 701 in addition to the configuration of the packet transmitting/receiving unit 401 shown in FIG. 8. In the following, description on the same matters as ones described above is omitted and only different portions are described.

The packet transmitting/receiving unit 7401 has the accumulation unit 701 which is connected to the TS stream identifying unit 402. Here, the accumulation unit 701 may be a hard disk drive (HDD), an optical disk (e.g., a CD or DVD), or a semiconductor disk (e.g., a SD card memory). By way of example, the packet transmitting/receiving unit 7401 transmits partial MPEG-TS data and the like accumulated on a hard disk, an optical disk, or the like using an HTTP range request.

This range request is requested by selecting the beginning of a range and the end thereof with the distance from the beginning of a file of a partial MPEG-TS accumulated in the accumulation unit 701, e.g., A and B (A and B are integers equal to or more than 0 satisfying A<B). While typically free values can be selected for A and B for general data, when video data such as an MPEG-TS is to be got as a range, efficient transmission can be performed by paying attention to the GOP or Picture structure of the data. However, the receiving side is unable to find out which portion of an accumulated file of the sending side constitutes a GOP and/or which portion represents an I picture.

Thus, upon receipt of an HTTP range request from the receiving side, the sending side returns GOPs which are respectively closest to the beginning and the end of the range as an HTTP response. This transmission method is called herein an HTTP Alignment Response Method (HTTP A/V Alignment Data Unit Response Method, abbreviated as HAR method). Selection of this transmission mode can be triggered in the following manner, for example.

1) The sending side (server) and the receiving side (the client) perform negotiation in advance using a mechanism of UPnP-A/V and the like.

2) Indicative information such as a character string indicating that the HAR method is used is inserted in an HTTP request header in expectation of a response by the HAR method. For instance, $$\text{har-value=gop}$$

is inserted in the HTTP request.

A server not supporting the HAR method does not respond to the indicative information, but a server supporting the HAR method responds to the indicative information to find the beginning of a GOP closest to the beginning of the range as a requested range from the requested data, and sets it as the range beginning in a response. The server also finds the beginning of a GOP closest to the end of the range as the requested range from the requested data, and sets it as the range end in the response. Then, the server inserts indicative information such as a character string that indicates the response is one by the HAR method into an HTTP response header. For instance, the server inserts into the HTTP response har-value=gop.

Through these operations, the client can partially get an MPEG-TS inserted in the HTTP response in units of GOPs despite the fact that the client has made a random range request for data in the server.

When an MPEG-TS is a continuously recorded file, once a response in units of GOP is received, the position of beginning of the next GOP can be easily calculated from the value of the range end that was received at the immediately preceding time when it is desirable to receive video as sequential frames. For example, the position of beginning of the next GOP is given by adding one byte to the value of the range end that was received at the immediately preceding time.

As stated above, in this example, when the receiving side makes a data request to the sending side by way of an HTTP range request, the data in the beginning or end of a transmitted data block is made correspond with data in the beginning of a data block unit, such as a GOP, managed on the sending side. For example, when the data is MPEG, the units of data blocks managed on the sending side can be specified in units of Pictures, macro-blocks, or blocks, in addition to the GOP described in the above example. Or, when the data block is a hard disk (abbreviated as an HDD) contained in the transmitting apparatus, an optical disk such as a CD and a DVD (having a number of types such as DVD-R and DVD-RAM), or a semiconductor disk such as a SD memory card, the recoding format for an HDD (e.g., LBA unit of 512 bytes), a CD (e.g., in units of 2 kB), or a DVD can be the logical block unit.

Accordingly, when data (a file or a stream) is MPEG, for example, if the a data range which is requested by the receiving side from the sending side with an HTTP range request does not align with the data boundary of a GOP unit or a Picture unit, in other words, if data alignment is not made, a GOP unit or a Picture unit that is positioned near the data range requested as an HTTP response can be returned as a response by way of processing on the server (i.e., the sending side). The receiving side thus can efficiently perform MPEG decoding from received data.

As an example of an MPEG-TS, when the server is a Blu-ray disk recorder, operational load on the server can be lightened because a GOP boundary position or an I picture position can be efficiently recognized using a PLAYLIST file or a CLIPINFO file to retrieve a GOP or I picture data. Also, in the case of MPEG-PS, when the server is a DVD-RAM disk recorder and its recording format is compliant with the DVD-VR standard, a management file called an IFO file is provided in the DVD-VR method. Thus, by utilizing management information in the IFO file, the server side can efficiently recognize a GOP boundary position or an I picture position to retrieve a GOP or I picture data, which improves utilization efficiency of the server as well. By utilizing a data management file having a structure similar to that of a PLAYLIST file, a CLIPINFO file, and/or an IFO file in such a manner, the server can easily employ the HAR method described above.

In this case, the server receives a range request value based on the HAR method from the client, and compares it with the IFO file provided in the server to determine a GOP block to return. Consequently, an A/V content can be transmitted with DTCP-IP applied thereto.

Also, methods described below can be implemented, for example, for decryption in a case where encrypted contents are recorded in the accumulation unit 701 (targeted contents are ones to which encryption according to so-called DRM digital copyright management is applied), and a user retrieves a list of the recorded contents, and selects a content the user wants to view (e.g., a movie, concert, drama).

Method 1) The user purchases information for decoding an encrypted content over the Internet or a telephone line, or at a convenience store and the like. The content is valid when 100 titles of movies, concerts, and/or dramas, for example, are already recorded in the accumulation unit 701 at the point when the user purchases the device of interest.

Method 2) The user downloads an encrypted content through the Internet, a CATV, or broadcasting. The user further purchases information for decoding the encrypted content over the Internet or a telephone line, or at a convenience store and the like.

Method 3) The user employs information for decoding an encrypted content that comes with the content when the user purchases the content as a packaged medium.

[4] Details of a Configuration for Transmitting a Specified Portion More Efficiently Next, description is given of a configuration for transmitting a specified portion more efficiently.

FIG. 12 is a block diagram showing the configuration of a packet transmitting/receiving unit 8401 used in this description. This packet transmitting/receiving unit 8401 has a data arrangement information generating/managing unit 801 in addition to the configuration of the packet transmitting/receiving unit 7401 shown in FIG. 11. In the following, description on the same matters as ones described above is omitted and only different portions are described.

The packet transmitting/receiving unit 8401 has the data arrangement information generating/managing unit 801 which is connected to the TS stream identifying unit 402. The accumulation unit 701 may be a hard disk drive (HDD), an optical disk (e.g., a CD, DVD), a semiconductor disk (e.g., a SD card memory), and the like. By way of example, the packet transmitting/receiving unit 7401 transmits partial MPEG-TS data and the like accumulated on a hard disk, an optical disk, or a like disk using an HTTP range request.

For the range request and response of HTTP, a method for efficiently accessing an I frame by the HAR method described above is described. Here, selection of a transmission mode can be triggered in the following manners, for example.

1) The sending side (the server) and the receiving side (the client) performs negotiation in advance using a mechanism of UPnP-A/V and the like.

2) Indicative information such as a character string indicating that the HAR method is used is inserted in an HTTP request header in expectation of a response by the HAR method. For example, har-value=i-picture:1 is inserted into an HTTP request. Here, as an operation for har-value=i-picture:*n*(*n* being an integer), the data arrangement information generating/managing unit 801 in the server calculates and generates position information for "i-pictures" within the range of range request. Based on the position information for an i-picture within the range of range request, the accumulation unit 701 extracts i-picture data skipping every nth I picture, and sends them to the client. When the value of n is "+", only i-pictures are extracted from the beginning of the range toward the end thereof and sent to the client skipping every nth i-pictures, that is, forward skip reproduction with frame skipping is performed. When the value of n is "−", only i-pictures are extracted from the end of the range toward the beginning thereof and sent to the client skipping every nth i-pictures, that is, reverse skip reproduction with frame skipping is performed.

By expanding "har-value" to "=i-picture: n (n being an integer)", the client can partially get an MPEG-TS inserted into an HTTP response in units of i-pictures despite the fact that the client has made a random range request for data in the server.

When there is information on the position and approximate size of I frames as management information for an MPEG-TS recorded in the HDD of the server, it is also possible to use the information to transmit data including I pictures to the client. As stated above, by making use of information on I-frame position in an MPEG file on the server, trick play, such as fast forward, fast rewind, and slow reproduction, can be efficiently realized. Thus, in general, a DRM-enabled A/V content can be transmitted using DTCP-IP.

A/V data may also be transmitted by switching from transmission by HTTP to transmission by RTP. In the case of RTP, when an appropriate start position is specified with RTCP, the HAR method supporting RTP can be applied there.

By using a picture information file such as the one shown in FIG. 13 to handle position information and/or time information for I/P/B pictures in the file as a common picture information file for a system that adopts a different MPEG file system, different file formats can be handled on a common platform.

For position information for MPEG I pictures, P pictures, or B pictures within a file of A/V data, I-picture, P-picture, or B-picture position information that is common among a number of different formats is generated from position information for a number of I pictures, P pictures, or B pictures and time information for the MPEG I pictures, P pictures, or B pictures, which are originally provided even when the A/V data is of a number of different formats, and this common I-picture, P-picture, or B-picture position information is used as reference information for position information and time information for MPEG I pictures, P pictures, or B pictures within the A/V data file. This has a great advantage of allowing a remote terminal to access a specific picture with the common position information or time information for I, P, or B pictures even when an HDD contains MPEG-TS files recorded in different recording formats.

For example, as in the example shown in FIG. 13, from an HDD, BD disk and the like in which partial TSs are recorded, a "picture information file" is read out that represents in a unified format the continuity of I, P, or B pictures and their position information in a file. A terminal remotely located via a network can finely reference each picture location even in a different TS recording format by referencing the unified picture information file by byte location and/or time information (timestamp).

In FIG. 13, "discont" is a 1-bit flag that indicates a discontinuity point of a partial TS. For example, when this value is "0", it means the partial TS is continuous and when "1", it means the TS is not continuous. Also, an "IPB flag" is a 2-bit flag for identifying an I picture, P picture, and B picture, the value being "00" means an I picture, "01" means a P picture, and "10" means a B picture. Here, for an I picture, the flag always needs to be described, and for a P or B picture, description is optional: the flag has not necessarily to be described. Also, "Byte-position" indicates byte positions of I pictures, P pictures, and B pictures in a leading file in 32 bits. Further, "PB_number" indicates the total number of P pictures and B pictures that are present between a certain I picture and the next I picture in 5 bits. "Timestamp" is time information for I pictures, P pictures, and B pictures, and "timestamp" uses the timestamp value of a TS at a specific position, such as the beginning of a time-stamped TS sequence that make up the individual MPEG I pictures, P pictures, or B pictures, by converting it into 40 bits. Definition of the values of individual parameters and flags is not limited to the combinations shown above.

As has been described above, trick play such as slow reproduction and fast reproduction which is detailed and visually pleasing is realized. The picture information file can be regarded as a filtering function for enabling remote terminal to view in a common file format a picture position in an MPEG-TS file which is recorded in a different format on a local terminal. In other words, a common picture information file can be generated from an A/V data file which records MPEG-TSs in its own file format and a relevant information file for the same.

In addition, the present embodiment provides an effect of enabling efficient access to MPEG I pictures, P pictures, or B pictures even in the case of implementation with transmitting/receiving apparatuses that do not implement AKE and/or encryption processing on A/V contents.

[5] Details of a Configuration for Transmitting Time-Based Discontinuity Information.

Next, description is given of details on a configuration for transmitting time-based discontinuity information. The packet transmitting/receiving unit used in this description has a similar configuration to that of the packet transmitting/receiving unit 8401 of FIG. 12 described earlier. Accordingly, in the following, description on the same matters as ones described above is omitted and only different portions are described.

Description is given of a case where a number of segment portions of an MPEG file (any general A/V content) accumulated on a hard disk using the accumulation unit 701 are transmitted from the sending side to the receiving side by the HTTP protocol. The transmission sequence of the HTTP protocol can be represented as the steps in FIG. 14(*b*), for example.

(Step-p1) The receiving side inquires of the sending side whether an MPEG file present on the sending side has an auxiliary data file, such as an IFO file for the DVD-VR specification, or a PLAYLIST file and/or a CLIPINFO file for the BD-RE specification. The picture information file shown in FIG. 13 can be also considered as an example of the auxiliary data file.

If the sending side has an auxiliary data file, processes described at step-c1 and step-c2 below are executed.

(Step-p2) If the sending side does not have the auxiliary data file mentioned at step-p1, the receiving side requests the sending side to generate one.

When the sending side cannot fulfill this request, though illustration omitted in the figure, as an example, the HAR method described above can be used to execute partial GET (range request) by HTTP.

When the sending side can fulfill this request, processes at step-c1 and step-c2 described below are executed for partial GET (range request) by HTTP.

(Step-c1) The sending side sends the auxiliary data file requested by the receiving side to the receiving side.

(Step-c2) The receiving side references the auxiliary file received from the sending side to request MPEG data in units of VOBs and I pictures from one or more portions of an MPEG file. For example, the receiving side requests n items of data, Ranges No. 1, No. 2, . . . , No. (n), in FIG. 14(*a*).

The packetization unit 406 learns time-based discontinuity points in the data to be transmitted by referencing data arrangement information, for example, and adds discontinuity information to those discontinuity points.

As a result of this processing, the data shown in FIG. 14(*c*) is transmitted. This transmitted data contains the discontinuity information added by the packetization unit 406 at time-based discontinuity points. As an example, when data contained in each of the ranges is temporally continuous in each of the ranges and not continuous with other ranges, discontinuity information is contained at the beginning of each of Ranges from No. 2 to No. (n).

Here, in a protocol sequence for a range request using the HTTP protocol, data might be transmitted being divided due to disconnection of a TCP connection during transmission of data corresponding to one Range. In this case, even if the original data is continuous on a temporal basis, a plurality of data blocks representing the divided original data are transmitted by repeating establishment, disconnection, establishment, and disconnection of a TCP connection.

In this situation, assuming that processing compliant with the DVB standard or ARIB standard, STD-B-21, or TR-B14, 15, which are applied to a conventional partial MPEG-TS, is performed, for example, time base for the data is regarded to be discontinuous, and it is necessary to add time-based discontinuity information, such as a DIT, at the beginning and end of each of the data blocks. Accordingly, Content-Length in the header of an HTTP response is increased from a value that represents the size of the requested original data by the addition of an encryption header plus the addition of the time-based discontinuity information.

Since the addition of the encryption information header is deleted in the packet receiving unit, it has not to be handled as a net transmitted content. The present embodiment gives description on the assumption that this encryption information header is not handled as a net transmitted content.

As a new mechanism for a case where a partial MPEG-TS is transmitted by HTTP, the present embodiment adopts a new algorithm in which the paketization unit 406 does not insert discontinuity information such as a DIT at the beginning or end of an HTTP response unless especially a time-based discontinuity point is explicitly shown, e.g., with the contents of data arrangement information.

Here, since the data structure of an MPEG-TS is described in units of GOPs or I pictures in the auxiliary data file, Ranges No. 1, No. 2, . . . , NO. (n) can be each in units of GOPs or I pictures of an MPEG-TS file, which can realize efficient data transmission adapted to the general decoding operation (which is employed with a meaning synonymous with a decoding algorithm and sequence) of MPEG.

As has been described above, by utilizing the GOP structure or I-frame position information of an MPEG file in the server, trick play, such as fast forward, fast rewind, and slow reproduction, can be efficiently realized. Thus, in general, a DRM-enabled A/V content can be efficiently transmitted by applying DTCP-IP.

Note that although the present embodiment uses HTTP, RPT may be used instead of HTTP. In the case of RTP, the receiving side may control transmission of an MPEG file using RTCP. In this case, there is an advantage of transmission size calculation being not complicated as in the case of HTTP.

When contents accumulated on HDDs or optical disks such as DVDs are of different accumulation formats, the client (sink) has to identify file formats in which I-frame position data for all the different contents is stored. As the number of formats increases, analysis and identification of many file formats becomes a large burden on the receiving side.

Thus, I-frame position information represented in a unified format is generated from I-frame position information of different formats by the data arrangement information generating/managing unit 801 on the sending side. This realizes easy trick play, such as fast forward, fast rewind, and slow reproduction, even from different accumulation formats, such as HDD recording formats of various manufacturers, DVD-VR method, or BD method.

In this packetization, in response to a range request or a data acquisition command from the receiving unit, payload data which contains at least one of the A/V data and the encryption mode information is transmitted by HTTP. When the A/V data on the sending side is MPEG, the range request or the data acquisition command is executed with reference to at least one piece of information out of discontinuity occurrence information or continuity information within an MPEG stream, position information for MPEG I pictures, P pictures, or B pictures in the file of the A/V data, and the respective numbers or the total number of P pictures and B pictures that are present between a certain I picture and the next I picture.

The discontinuity occurrence information or continuity information in an MPEG stream is DIT information, which is described in the ARIB standard, ARIB-TR-B14 or ARIB-TR-B14, Part 2, for instance, and it is also possible to generate discontinuity occurrence information or continuity information with different logical description based on this information. A discontinuity point of a stream refers to, for a MPEG partial TS, for example, a point at which discontinuity of an MPEG-TS stream in terms of system time base occurs, e.g., a point at which PCR becomes discontinuous, or a point at which the discontinuity of continuity_counter in the transport packet header of any one of packets that make up the partial TS occurs.

Also, for position information for MPEG I pictures, P pictures, or B pictures in a file of A/V data, I-picture, P-picture, or B-picture position information that is common among a number of different formats is generated from position information for a number of I pictures, P pictures, or B pictures and time information for those MPEG I pictures, P pictures, or B pictures, which are originally provided even when the A/V data is of a number of different formats, and this common I-picture, P-picture, or B-picture position information is used as reference information for position information and time information for MPEG I pictures, P pictures, or B pictures within the A/V data file. This has a great advantage of allowing a remote terminal to access a specific picture with the common position information or time information for I, P, or B pictures even when an HDD contains MPEG-TS files recorded in different recording formats.

For example, as an example is shown in FIG. 13, from an HDD or a BD disk in which partial TSs are recorded, a picture information file is read out that represents in a unified format the continuity of I, P, or B pictures and their position information within a file. A terminal remotely located via a network can acquire the contents of this unified picture information file as an example of the data arrangement information described above, and reference a desired picture position with byte position or time information (timestamp) to thereby reference each picture position finely even in a different TS recording format.

In FIG. 13, "discont" is a 1-bit flag that indicates a discontinuity point of a partial TS. For example, when the value of the flag is "0", it means the partial TS is continuous, and when "1", it means the TS is discontinuous. Also, an "IPB flag" is a 2-bit flag for identifying an I picture, P picture, and B picture: when its value is "00", it means an I picture, when "01", a P picture, and when "10", a B picture. Here, for an I picture, description is always needed, and for a P or B picture, description is optional and the flag has not necessarily to be described. Also, "Byte_position" indicates the byte position of I pictures, P pictures, and B pictures in a leading file in 32 bits. Further, "PB_number" indicates the total number of P pictures and B pictures that are present between a certain I picture and the next I picture in 5 bits. "Timestamp" is time information for an I picture, a P picture, and a B picture, and "timestamp" uses the timestamp value of a TS at a specific position, such as the beginning of a time-stamped TS sequence that makes up the individual MPEG I picture, P picture, or B picture, by converting it into 40 bits. Definition of the values of individual parameters and flags is not limited to the combinations shown above.

As stated above, according to the present embodiment, trick play such as slow reproduction and fast reproduction which is fine and visually pleasing is realized. The picture information file can be regarded as a filtering function for enabling a remote terminal to view in a common file format a picture position in an MPEG-TS file which is recorded in a different format on a local terminal. In other words, a common picture information file can be generated from an A/V data file which records MPEG-TSs in its own file format and a relevant information file for the file.

In addition, the present embodiment provides an effect of enabling efficient access to MPEG I pictures, P pictures, or B pictures even in the case of implementation with transmitting/receiving apparatuses that do not implement AKE and/or encryption processing on A/V contents.

[5.1] A Specific Example of Handling of Time-Based Discontinuity Information

Next, specific description is additionally given of handling of time-based discontinuity information in a case where multiple portions of an A/V stream are transmitted.

Description is given of a case where multiple segment portions of an MPEG file (any general A/V content) accumulated on a hard disk using the accumulation unit 701 of FIG. 12 are transmitted from the sending side to the receiving side by the HTTP protocol. The transmission sequence of the HTTP protocol basically follows the steps shown in FIG. 14(*b*), for example.

(Step-p1) and (step-p2) are as described above.

At (step-c1), the sending side transmits an auxiliary data file requested by the receiving side to the receiving side.

At (step-c2), the receiving side references the auxiliary file received from the sending side to request MPEG data from one or more portions of an MPEG file in units of VOBs and I pictures. For example, the receiving side requests three items of data, Ranges No. 1, No. 2, and No. 3 shown in FIG. 15(*a*). Here, in the auxiliary data file, time-based discontinuity information (e.g., a DIT) is described together with the data structure of an MPEG-TS in units of GOPs or I pictures. Thus, Ranges No. 1, No. 2 and No. 3, which are data to be transmitted to the receiving side, is each a data block in units of GOPs or a data block in units of I pictures in the MPEG-TS file including time-based discontinuity points.

Figure 15B:
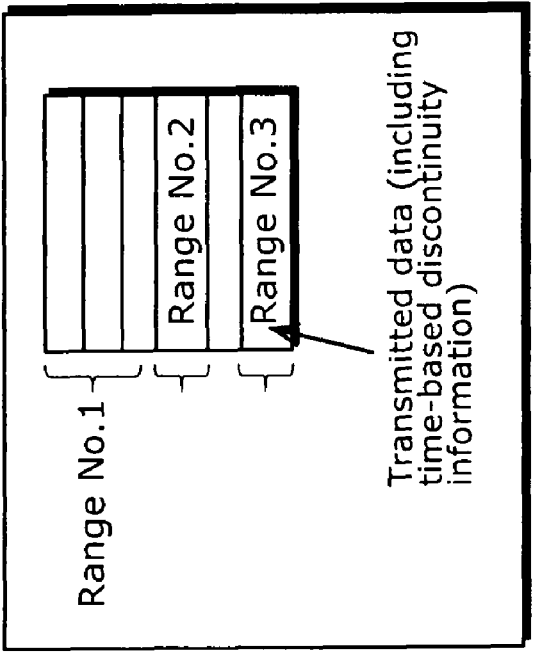
FIG. 15(*a*) illustrates an example of A/V data to be transmitted as packets by HTTP according to the present invention along with discontinuity points, and FIG. 15(*b*) shows an example of transmitted data.
Figure 15A:
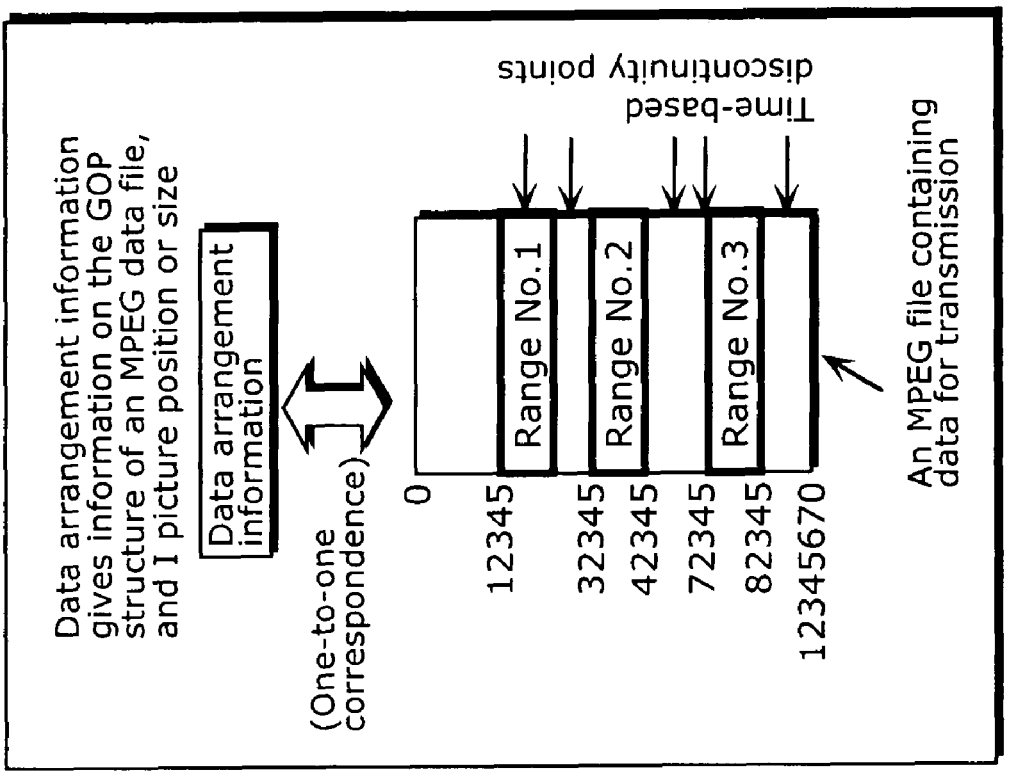

The data to be transmitted shown in FIG. 15(*a*) contains a time-based discontinuity point within Range No. 1 as shown with the arrow on the right of Range No. 1 in the figure. Also in the figure, as shown with the arrow on the right of the beginning of Range No. 3, the data has a time-based discontinuity point at the beginning of Range No. 3.

Data transmitted in this case is represented as FIG. 15(*b*), where the data contains time-based discontinuity information at the time-based discontinuity point in Range No. 1 and at the beginnings of Ranges No. 2 and No. 3.

Since the addition of an encryption information header on the sending side is deleted in the packet receiving unit, the description here also assumes that the header is not handled as a net transmitted content.

Also, as mentioned above, even when transmitted data is divided due to disconnection of a connection by a transmission protocol (e.g., TCP), discontinuity information is not added at the beginning or end of each piece of divided transmitted data as long as the original data is temporally continuous.

As has been described above, efficient data transmission can be realized for the general decoding operation of MPEG (which is synonymous with the algorithm or sequence of MPEG decoding). By making use of the GOP structure or I-frame position information of an MPEG file in the server, it is possible to efficiently realize trick play, such as fast forward, fast rewind, and slow reproduction. Consequently, in general, DRM-enabled A/V contents can be efficiently transmitted by applying DTCP-IP.

[5.2] A Specific Example of Unneeded Data Handling

Next, specific description is additionally given of handling of unneeded data when multiple portions that include unneeded data in either one or both of their beginning and end are transmitted.

Description is given of a case where a number of segment portions of an MPEG file (any general A/V content) accumulated on a hard disk using the accumulation unit 701 of FIG. 12 are transmitted from the sending side to the receiving side by the HTTP protocol. The transmission sequence of the HTTP protocol basically follows the steps shown in FIG. 14(*b*), for example.

(Step-p1) and (step-p2) are as described above.

At (step-c1), the sending side transmits an auxiliary data file requested by the receiving side to the receiving side.

At (step-c2), the receiving side references the auxiliary file received from the sending side to request MPEG data from one or more portions of an MPEG file in units of VOBs and I pictures. For example, the receiving side requests three items of data, Ranges No. 1, No. 2, and No. 3 shown in FIG. 16(*a*). Here, in the auxiliary data file, on the basis of logical format information for a recording medium, partial MPEG-TSs and/or DV streams are arranged (mapped) in the logical format.

The method of this arrangement may be a method of arranging partial MPEG-TSs on a BD-RE-compatible disk by referencing a PlayList file or a ClipInformation file, which are defined in the BD-RE standard (Part 1, Part 2, and Part 3 of Blu-ray Disk Rewritable Format), for instance. Mapping of arrangement of partial MPEG-TSs on a BD-RE-compatible disk with reference to a PlayList file or a ClipInformation file is described in Matsushita Technical Journal, October 2004, pp. 34 to 38, "Blu-ray Disk Rewritable Format (2), ronri kikaku, chosakuken hogo kikaku (logical standard and copyright protection standard)", or Nikkei Electronics, Jul. 21, 2003 issue, pp. 125 to 138, for instance.

Now, in arrangement of partial MPEG-TSs in data recording logical sectors (corresponding to LBA for an HDD, being set at several hundred bytes to several kilobytes) as with a BD-RE-compatible disk, the beginning of a logical sector does not necessarily correspond with the beginning of a partial MPEG-TS with auxiliary data. Accordingly, the position of recorded data, such as a partial MPEG-TS, can be represented by a pair of a logical sector number and information on an offset (position) from the beginning within that logical sector.

When the position information for a partial MPEG-TS recorded on a disk is managed with a pair of a logical sector number and information on an offset (position) from the beginning within that logical sector, data that is present between the beginning of the sector and a position immediately before where the partial MPEG-TS is recorded is unneeded data. Especially when editing is performed, MPEG decoding cannot be performed with this unneeded data alone, thus this data becomes useless garbage data.

In the present embodiment, when the position information for a partial MPEG-TS recorded on a disk is managed with a pair of a logical sector number and information on an offset (position) from the beginning within the logical sector, the client efficiently accesses only valid data on the server via a network in consideration of such unneeded data, realizing smooth trick play or transmission of the valid data.

Figure 16B:
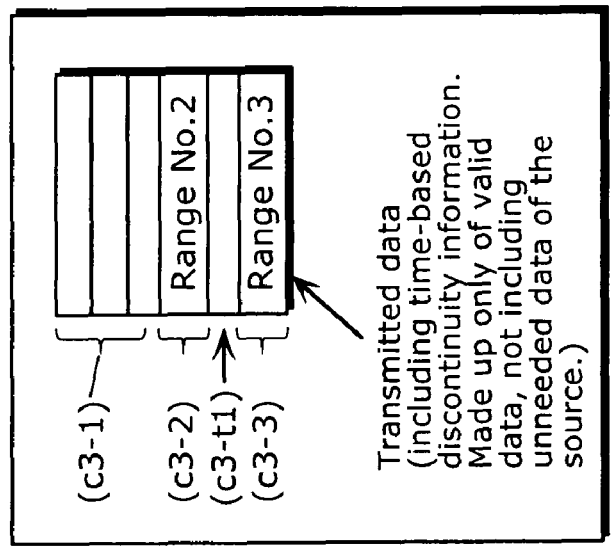
FIG. 16(b) shows an example of transmitted data.
Figure 16A:
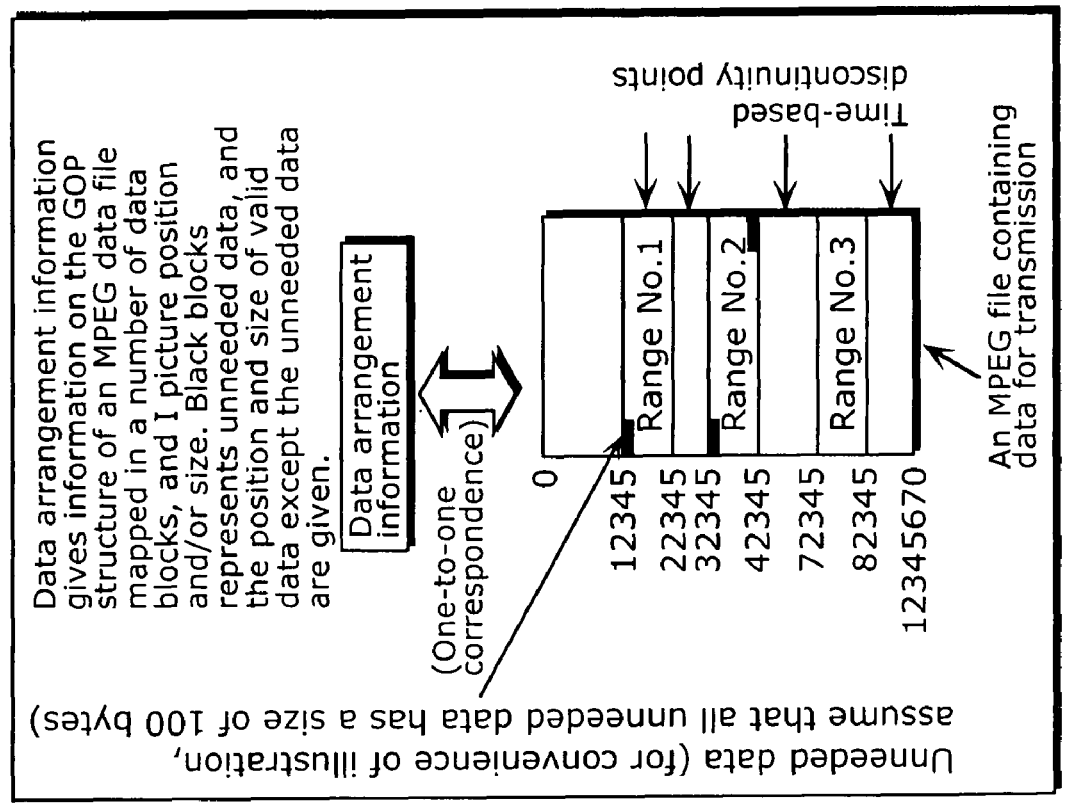
FIG. 16(*a*) illustrates an example of A/V data which is transmitted as packets by HTTP and which includes unneeded data according to the present invention.

Now, the client requests (an HTTP request) three items of data, Ranges No. 1, No. 2, and No. 3 shown in FIG. 16 (*a*), from the server. Here, in the auxiliary data file on the server, along with the data structure of an MPEG-TS in units of GOPs or I pictures, there are described time-based discontinuity information (e.g., a DIT) as well as auxiliary data, such as pair information of a logical sector number and information on an offset (position) from the beginning within that logical sector as position information for a partial MPEG-TS recorded on the disk, and the client references the auxiliary data on the server via a network.

This enables the client to directly access valid data such as GOPs or I pictures of a partial MPEG-TS recorded in sectors of a server disk (i.e., to request necessary data with the HTTP range GET).

At the beginnings and ends of Ranges No. 1 and No. 2 shown in FIG. 16(*a*), unneeded data represented by a black and small block is present. Also, the data for transmission of FIG. 16(*a*) contains a time-based discontinuity point in Range No. 1 as indicated with the arrow on the right of Range No. 1. Also, as indicated with the arrow on the right of the beginning of Range No. 3 in the figure, the data has a time-based discontinuity point at the beginning of Range No. 3.

In this case, data transmitted to the receiving side is a valid data block that contains a time-based discontinuity point in each of Ranges No. 1, No. 2, and No. 3 and excludes unneeded data.

Received data is, as specifically shown in FIG. 16(*b*), (c3-1) information of Range No. 1 which does not include unneeded data of the sending side and includes time-based discontinuity information, (c3-2) information of Range No. 2 which does not include unneeded data of the sending side, and (c3-3) information of Range No. 3 which has time-based discontinuity information attached at its beginning.

Since the addition of an encryption information header on the sending side is deleted in the packet receiving unit, the description here also assumes that the header is not handled as a net transmitted content.

Also, as mentioned above, even when transmitted data is divided due to disconnection of a connection by a transmission protocol (e.g., TCP), discontinuity information is not added at the beginning or end of each piece of divided transmitted data as long as the original data is temporally continuous.

As stated above, by making control to transmit a valid data block which contains time-based discontinuity points and excludes unneeded data from the server to the client, it is possible to realize efficient data transmission for general decoding operation of MPEG (which is synonymous with the algorithm or sequence of MPEG decoding). By making use of the GOP structure or I-frame position information for an MPEG file in the server, it is possible to efficiently realize trick play, such as fast forward, fast rewind, and slow reproduction. Consequently, in general, it is made possible to transmit DRM-enabled A/V contents by applying DTCP-IP.

[6] A Variation for Delivering Copy Control Information Using a Dedicated Delivery Channel Next, description is given of a variation for delivering copy control information (CCI) using a dedicated delivery channel. The configuration of a packet transmitting/receiving unit 17401 in the present variation is shown in FIG. 17.

Figure 17:
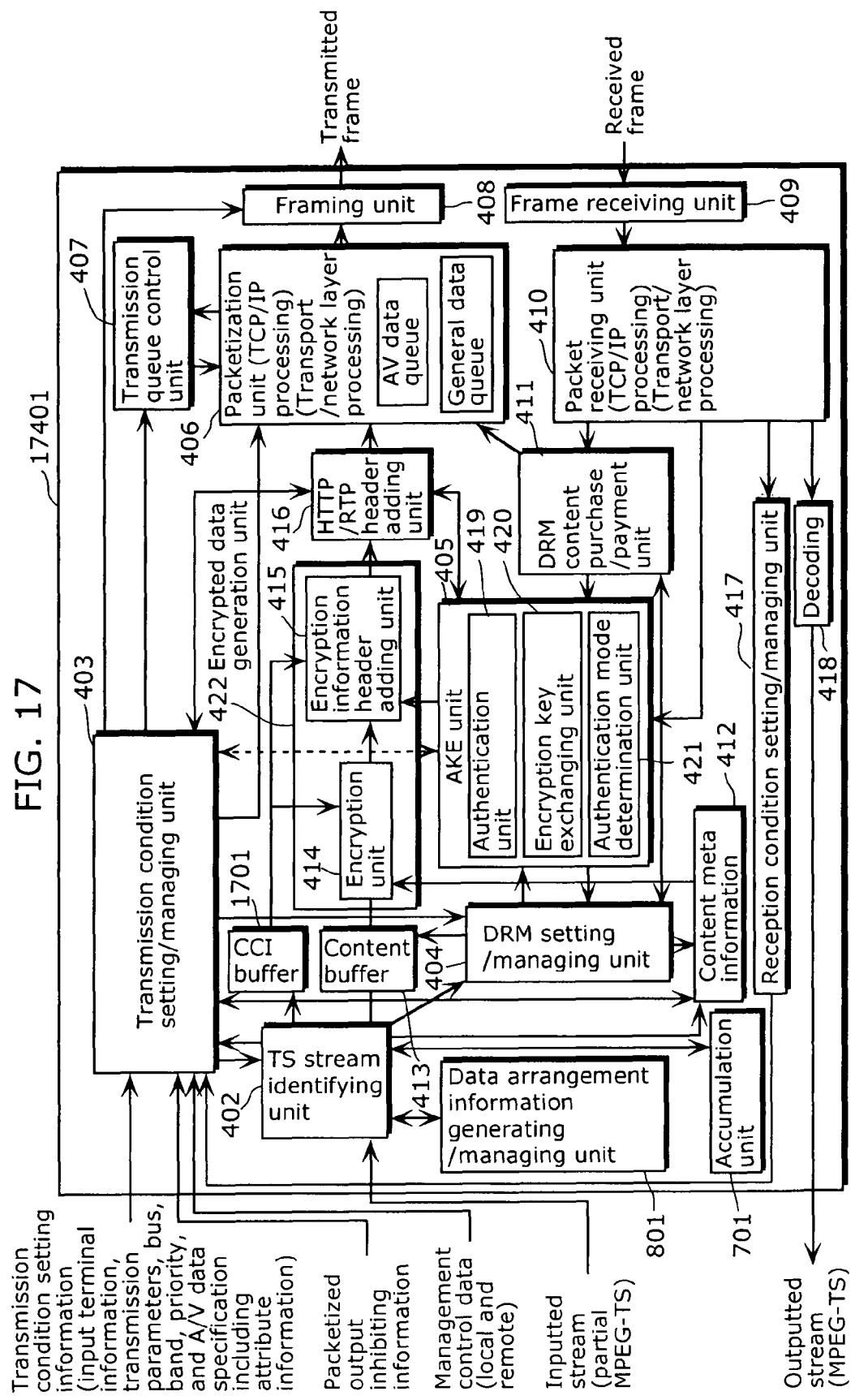
FIG. 17 is a block diagram of the packet transmitting/receiving unit according to the present invention.

The packet transmitting/receiving unit shown in FIG. 17 essentially has a similar configuration to that of the packet transmitting/receiving unit 8401 of FIG. 12, but is different in that it has a CCI buffer 1701 in FIG. 17 and delivers CCI from the TS stream identifying unit 402 to the encrypted data generation unit 422 using a dedicated delivery channel including the CCI buffer 1701. In the following, description on the same matters as ones described above is omitted and only different portions are described.

It is assumed in FIG. 17 that a signal outputted from the TS stream identifying unit 402 to the content buffer 413 is a partial MPEG-TS with a header which is supposed to be stored (referred to as a "storable partial MPEG-TS"), which is a stream with a 4-byte header added to each partial MPEG-TS. Here, the four bytes (i.e., 32 bits) as the header supposed to be accumulated is composed of 2-bit CCI and a 30-bit timestamp. The 2-bit CCI is CCI which is supposed to be accumulated, and only supports three modes: unencrypted Copy Free mode (CF), encrypted Copy Free mode (CF/EPN: Encryption plus non-Insertion), and Copy No More mode (CNM). In this case, a signal format handled by the content buffer 413 does not support CCI for the COG mode or Copy Never (CN) mode, for example.

In a case where a content that allows only one-generation copying (COG), such as ones provided in Japanese terrestrial digital broadcasting (as of February 2005), is once accumulated on an HDD and reproduced, since a broadcast content of COG becomes a CNM content through accumulation, the reproduction output thereof can be passed to the encrypted data generation unit 422 in the "storable partial MPEG-TS" format, and subjected to normal encryption and addition of an encryption header in accordance with the CCI in a header of the "storable partial MPEG-TS" format.

However, when a COG content from terrestrial digital broadcasting is directly outputted to the encrypted data generation unit 422 in the "storable partial MPEG-TS" format as a conventional format without being accumulated, it is impossible to pass correct CCI to the encrypted data generation unit 422 and perform normal encryption and addition of an encryption header in accordance with the CCI in the header of "storable partial MPEG-TS" format because the "storable partial MPEG-TS" format does not support the COG mode as a new mode.

Thus, the present embodiment newly adds the CCI buffer 1701 in order to pass correct CCI from the TS stream identifying unit 402 to the encryption unit 414 and the encryption information header adding unit 415.

The CCI buffer 1701, encryption unit 414, and encryption header adding unit 415 support transmission of all CCI used by the packet transmitting/receiving unit including the COG mode. The CCI buffer 1701 synchronizes with stream output from the content buffer 413 via the CCI buffer 1701, and passes correct CCI to the encryption unit 414 and the encryption information header adding unit 415. This enables encryption and addition of an encryption header with correct CCI even when the signal format handled by a content buffer including the COG mode does not support CCI for the COG mode, for example.

As stated above, when the header of an A/V stream which is internally handled does not support all the CCI modes handled by the packet transmitting/receiving unit 17401 because the packet transmitting/receiving unit 17401 only supports a conventional format, it is made possible to add a new CCI mode even with a packet transmitting/receiving unit of a conventional configuration by providing a channel for handling all the CCI modes handled by the packet transmitting/receiving unit 17401 and a buffer for synchronizing timing with the stream encryption.

This supporting of the CCI mode can exert a similar effect by providing a channel and a buffer dedicated for the CCI mode not only on the sending side but on the receiving side as the sending side.

Furthermore, in the above-described embodiment, when packets are transmitted over a communication network that does not guarantee orderliness of packets, such as a general IP network, the packets may be transmitted with sequence numbers assigned thereto, and the receiving side may use the sequence numbers to guarantee their orderliness. This guaranteeing of orderliness is made in and above the fourth layer of the OSI model, namely, in the RTP protocol, video signal processing, and so forth.

It is also possible to take a measure to prevent fragmentation of A/V signal packets transmitted from the sending side in the network. Specifically, the sending side may check a maximum size (MTU) that precludes fragmentation in a communication network through application-level processing in advance and transmit packets with a size equal to or less than that size. Alternatively, since the RFC standard prescribes that every terminal be able to handle IP packets having a size of 576 bytes, IP packets equal to or smaller than this size cannot be fragmented in many network devices such as routers. Accordingly, the packet size of an A/V signal which is hardware-processed on the sending side may be adjusted so that IP packets have a size equal to or less than 576 bytes. In a case where fragmentation does not take place to A/V signal packets which are processed with hardware on the sending side, any received packet that is fragmented may be processed as a general packet. Also, needless to say, since an IP packet exceeding the maximum value for Ethernet™ has to be fragmented in a transmitting terminal, IP packets must be equal to or smaller than the maximum value for IP packets in order not to cause fragmentation of priority packets.

Also, when fragmentation is very unlikely to occur in a communication network, load of fragmentation processing on a receiving terminal can be lessened by setting a flag indicating inhibition of fragmentation in the IP headers of A/V signal packets that are hardware-processed and transmitted on the sending side and transmitting the packets so as to have a router discard IP packets when the router has to fragment IP packets. In this case, although a very small number of packets are lost, quality of communication can be compensated by performing error correction or modification on the receiving side.

Further, although the above-described embodiment illustrated Ethernet™ as the communication network protocol, the present invention is not limited thereto and may also employ a wireless protocol such as IEEE 802.11a/b.

Also, although MPEG-TS was used as an example of video signal processing, this is not limitation and the applicable range of inputted data used in the present invention include any stream pertaining to video and audio, including MPEG-TS streams such as MPEG1/2/4 (ISO/IEC 13818), uncompressed SD format signal defined in SMPTE314M (DV-based) and SMPTE259M standards, uncompressed HD format defined in SMPTE292M standard, a transmission stream format for MPEG-TSs of DV based on IEEE1394 or digital broadcasting defined in IEC61883 standard, MPEG-TS format based on DVB-ASI defined in DVB standard A010, and streams standardized by MPEG-PES, MPEG-ES, MPEG4, ISO/IEC, H.264, and so forth. The data rate for video and/or audio is not limited to CBR (constant bit rate). Further, in addition to video and audio, general real-time data, or any data that is preferentially transmitted/received is not excluded from the present invention.

The packetization unit can perform the packetization by adding timestamps to data blocks constituting A/V data, and mapping one or more time-stamped data blocks together as RTP or HTTP payload.

Also, when A/V data is to be transmitted in an MPEG-TS, the packetization means adds a timestamp to each TS packet and maps a plurality of time-stamped TS packets together on RTP or HTTP.

Also, the clock for timestamps added to individual TS packets is equivalent to the system clock frequency for MPEG, and the packet transmitting apparatus further includes clock regeneration means that receives TS packets and removes transmission jitter that has been added to Program Clock Reference (PCR) through network transmission of an MPEG-TS from the timestamps added to the received TS packets to regenerate the MPEG system clock.

Further, in a case the number of effective bits of a timestamp added to an externally inputted TS or the number of effective bits of a timestamp added to a TS reproduced from an accumulation medium is different from the number of effective bits of a timestamp which is added to each TS packet, when PCR of an MPEG stream becomes discontinuous and discontinuity in terms of system time base does not occur, and when the discontinuity of continuity_counter of a TS does not occur, the packetization means performs packetization by not changing the timestamp added to the externally inputted TS or the timestamp added to the TS reproduced from the accumulation medium as well as the timestamp which is added to TS packets, and just moving them, and when the MPEG PCR for the stream becomes discontinuous and a point at which discontinuity in terms of system time base occurs, or when the discontinuity of continuity_counter of a TS occurs, the packetization means performs packetization by inserting a TS packet for notifying the occurrence of TS discontinuity at a point where the discontinuity occurs.

File transfer of data is also included in the applicable range of inputted data for use in the present invention. In the case of file transfer, transmission faster than real time is also possible under a certain condition depending on the relationship between the processing capability of transmitting and receiving terminals and transmission delay time between the terminals.

Also, as the applicable range of inputted data for use in the present invention, it is made possible to transmit general A/V contents supporting DRM, such as different DRM methods for server-type broadcasting and various companies, by use of DTCP-IP.

Also, in the above-described embodiment, assuming N is an integer equal to or greater than 2, the packet transmitting/receiving apparatus may use N ports for UDP or TCP to transmit N programs composed of A/V data by assigning the programs to the N ports respectively. Here, the N programs to be assigned to the respective N ports each represent a broadcasting reception tuner or an accumulation media device contained in the source in the container format in a UPnP part, represent a broadcasting receiving channel or an accumulated program in the item format in the UPnP part, represent the position where each item (which becomes res as a resource) is present as a URI, and represent a transmission protocol or attribute information in res expression using ProtocolInfo of UPnP, which can realize a fine transmission system, such as simultaneous transmission of multiple programs to multiple clients.

Also, in the case of broadcasting reception, when there are a plurality of transmission streams from the source to the sink for N programs (res) which are assigned to N ports respectively on the sending side, by representing each of the streams in property format for UPnP, and including, as an attribute of the property for a specific transmission stream, any one of: the container type of a tuner; a tuner ID for each container type of the tuner; a channel ID selected on the tuner; availability information on sharing or takeover of a transmission stream with other client; the port number for TCP or RTP used by the transport layer in which the stream is transmitted; a connectionID of a UPnP-A/V unit which is set by a Connection Manager of the UPnP-A/V unit on the sink for the Connection Manager of the source in relation to logical connection for an item; and a connection ID for UPnP-A/V which is set by the Connection Manager of the UPnP-A/V unit of the source for the Connection Manager of the sink in relation to logical connection for an item, the receiving side (or client or sink) can judge whether or not there is free space in a transmission stream and which channel on which tuner is selected by referencing the property and the attribute thereof of the transmission stream when the receiving side selects a channel on a tuner on the sending side (server or source).

For example, as a UPnP-A/V container structure for broadcasting reception, the containers of a tuner are placed under <root>. As container types, a tuner container is assigned for each broadcasting system, such as terrestrial digital, BS digital, and 110-degree wideband CD digital. In this case, channels of each broadcasting system are assigned as items under each tuner container. Using search or brows command for a UPnP CDS, tuner containers and channel items in those tuner containers of the sending side can be recognized from the receiving side. An item as a channel has associated information transmitted by a broadcasting station.

Similarly, in the case of reproduction of an accumulated content, when there are a plurality of transmission streams from the source to the sink for N programs which are assigned to N ports respectively of the sending side, by representing in property format of UPnP, and including, as an attribute of the property of a specific transmission stream, any one of: the container type of an accumulation media device; an accumulation media device ID for each container type of the accumulation media device; a program ID selected on the accumulation media device; availability information including sharing of a transmission stream; the port number for TCP or RTP used by the transport layer in which the stream is transmitted; a connectionID of a UPnP-A/V unit which is set by a Connection Manager of a UPnP-A/V unit on the sink for the Connection Manager of the source in relation to logical connection for an item; and a connection ID of the UPnP-A/V unit which is set by the Connection Manager of the UPnP-A/V unit of the source for the Connection Manager of the sink in relation of logical connection for an item, the sink can judge whether there is free space in a transmission stream or not and which program in which accumulation media device is selected, and the like, by referencing the property and the attribute thereof of the transmission stream when the sink selects a program in an accumulation media device of the source.

As a UPnP-A/V container structure for a case where an accumulating or recording device is a hard disk drive (HDD), a DVD-RAM drive, or a BD-Drive, each container is placed under <root>. As container types, a container for each device is assigned to each of the HDD, DVD-RAM drive, and BD drive. In this case, an accumulated or recorded content is assigned as an item under each container, e.g., by program. This enables the receiving side to recognize accumulating or recording device containers of the sending side and accumulated or recorded contents in those accumulating or recording device containers as items, e.g., by program, by use of search or brows command for a UPnP CDS. An accumulated or recorded item has associated information which is given at the time of recording.

Also, when the client receives and accumulates an item belonging to a broadcasting container of the transmitting server, the client utilizes an attribute of the tuner container for each broadcasting system (an attribute that identifies broadcasting systems, such as terrestrial digital, BS digital, 110-degree wideband CS digital) to generate a property for each broadcasting system, and accumulates or records the property in an accumulating or recording device to save it as the property of the generated item. As a result, even when the containers of the accumulating or recording device is not by broadcasting system, it is possible to identify from which broadcasting system a content has been broadcast by referencing the property of the item reproduced from an accumulating or recording device.

Consequently, either in the case of broadcasting reception or reproduction of an accumulated content, a client that makes a new server connection can understand the utilization of the server, and a content can be selected and transmitted more efficiently.

By logically associating a UPnP-A/V unit with a transport unit that uses HTTP or RTP which employs TCP or UDP by way of a logical pair of "the port number for TCP or UDP used by a transport layer in which a stream is transmitted" and "a connectionID of the UPnP-A/V unit which is set by a Connection Manager of a UPnP-A/V unit of the sink for the Connection Manager of the source in relation to logical connection for an item, or a connection ID of the UPnP-A/V unit which is set by the Connection Manager of the UPnP-A/V unit of the source for the Connection Manager of the sink in relation of logical connection for an item", a UPnP-A/V layer that uses a CDS or Connection Manager Service (CMS) can be logically and one-to-one associated with a transport layer that handles HTTP/TCP/IP, which thus enables easier realization of transmission control, such as establishment of a connection, selection of a content, transmission of a content, disconnection of a connection, management of an existing connection, and the like. In addition, by describing the connection ID of the UPnP-A/V unit in an extended field of the message header of an HTTP request message or in an extended field of the message header of an HTTP response message, a transmission control unit based on the HTTP protocol can be logically and one-to-one associated with the UPnP-A/V unit.

Industrial Applicability

The present invention receives terrestrial digital broadcasting and the like and transmits a channel selection signal therefor to a television or a personal computer in another room via an IP network to enable remote viewing of the same. The present invention also enables a received signal for digital broadcasting to be recorded on a HDD or DVD disk and a reproduction signal for the same to be remotely viewed from another room via an IP network while selection of a recorded content title or trick play are performed. Particularly, the present invention can inhibit unauthorized copying of a copy-limited content such as ones from digital broadcasting or a DVD disk because copy control information set by the copyright holder is passed.

The invention claimed is:

1. A packet transmitting apparatus that transmits packet data to a packet receiving apparatus, said packet transmitting apparatus comprising:
   an A/V data information acquisition unit operable to acquire A/V data information including at least one information from among input terminal information which indicates a terminal to which A/V data is inputted, data format information which indicates a data format of the A/V data, and attribute information which indicates an attribute of the A/V data;
   a data input unit operable to accept input of the A/V data and non-A/V data;
   a transmission condition setting/managing unit operable to extract, from the non-A/V data or the A/V data, at least one information from among: billing information or reproduction control information or copy control information for the A/V data; packet data transmission permitting information; and MAC address information for a transmission destination, and to generate, from the extracted information, encryption mode information which indicates an encryption mode during transmission of the A/V data;
   an encrypted transmission data generation unit operable to perform encryption control on the A/V data inputted from said data input unit based on a transmission condition which is determined by combining the input terminal information, the data format information, and the attribute information, and to generate encryption-controlled transmission data with an encryption information header by adding, to the encryption-controlled A/V data, the encryption information header which is based on the encryption mode information;
   a packetization unit operable to generate a packet by adding a packet header which combines one or more protocols from among a HyperText Transfer Protocol, a Transmission Control Protocol, a Real-time Transport Protocol, a User Datagram Protocol, and an Internet Protocol to data including the encryption-controlled transmission data with an encryption information header generated by said encrypted transmission data generation unit, and adding information representing discontinuity of an MPEG stream in terms of system time base, at a point where time-based discontinuity occurs in the A/V data;
   an authentication unit operable to perform authentication processing with the packet receiving apparatus;
   a transmission protocol determination unit operable to determine a transmission protocol for the A/V data between said packet transmitting apparatus and the packet receiving apparatus, by using at least one of the input terminal information, the attribute information, and information which indicates a transmission mode specified by the packet receiving apparatus; and
   a transmission unit operable to transmit, in accordance with the transmission protocol determined by said transmission protocol determination unit, the packet including the encryption-controlled transmission data with an encryption information header generated by said packetization unit to the packet receiving apparatus, after authentication processing with the packet receiving apparatus is completed through the authentication processing,
   wherein, when the A/V data is accumulated in a recording medium which is made up of a plurality of data block areas having a predetermined size, and a recording position of the A/V data is managed with an identification number of one of the plurality of data block areas and offset information from the beginning of the data block area, only the A/V data is packetized and transmitted to the packet receiving apparatus by excluding unneeded data that is recorded outside a range specified by the identification number and the offset information.

2. The packet transmitting apparatus according to claim 1, wherein said authentication unit is operable to perform acquisition of address information for the A/V data and authentication processing with the packet receiving apparatus, by using URI information or extended URI information for the A/V data in said packet transmitting apparatus.

3. The packet transmitting apparatus according to claim 1, wherein said packetization unit is operable to omit adding the information which represents discontinuity of an MPEG stream in terms of system time base at a point where the A/V data being transmitted is divided due to re-establishment of a connection on a communication line during data transmission by the HyperText Transfer Protocol.

4. The packet transmitting apparatus according to claim 1, wherein said packetization unit is operable to make a data length to be inserted into a HyperText Transfer Protocol response a length which is an original data length plus the length of information that represents the time-based discontinuity.

5. The packet transmitting apparatus according to claim 4, wherein, when a length which is the original data length plus the length of information that represents the time-based discontinuity is transmitted as a response, as the data length inserted into the HyperText Transfer Protocol response, said packetization unit is operable to supply offset information for acquiring valid data by offsetting information about a start position or an end position of valid data within transmitted data by the length of the information which represents the time-based discontinuity.

6. A packet transmitting method for transmitting packet data to a packet receiving apparatus, said method comprising:
   an A/V data information acquisition step of acquiring A/V data information including at least one information from among input terminal information which indicates a terminal to which A/V data is inputted, data format information which indicates a data format of the A/V data, and attribute information which indicates an attribute of the A/V data;
   a data input step of accepting input of the A/V data and non-A/V data;
   a transmission condition setting/managing step of extracting, from the non-A/V data or the A/V data at least, one information from among: billing information or reproduction control information or copy control information for the A/V data; packet data transmission permitting information; and MAC address information for a transmission destination, and generating, from the extracted information, encryption mode information which indicates an encryption mode during transmission of the A/V data;

an encrypted transmission data generation step of performing encryption control on the AN data inputted from said data input step based on a transmission condition which is determined by combining the input terminal information, the data format information, and the attribute information, and generating encryption-controlled transmission data with an encryption information header by adding, to the encryption-controlled A/V data, the encryption information header which is based on the encryption mode information;

a packetization step of generating a packet by adding a packet header which combines one or more protocols from among a HyperText Transfer Protocol, a Transmission Control Protocol, a Real-time Transport Protocol, a User Datagram Protocol, and an Internet Protocol to data including the encryption-controlled transmission data with an encryption information header generated by said encrypted transmission data generation unit, and adding information representing discontinuity of an MPEG stream in terms of system time base, at a point where time-based discontinuity occurs in the A/V data;

an authentication step of performing authentication processing with the packet receiving apparatus;

a transmission protocol determination step of determining a transmission protocol for the A/V data between a packet transmitting apparatus and the packet receiving apparatus, by using at least one of the input terminal information, the attribute information, and information which indicates a transmission mode specified by the packet receiving apparatus; and a transmission step of transmitting, in accordance with the transmission protocol determined in said transmission protocol determination step, the packet including the encryption-controlled transmission data with an encryption information header generated by said packetization unit to the packet receiving apparatus, after authentication processing with the packet receiving apparatus is completed through the authentication processing, wherein, when the A/V data is accumulated in a recording medium which is made up of a plurality of data block areas having a predetermined size, and a recording position of the A/V data is managed with an identification number of one of the plurality of data block areas and offset information from the beginning of the data block area, only the A/V data is packetized and transmitted to the packet receiving apparatus by excluding unneeded data that is recorded outside a range specified by the identification number and the offset information.

7. A non-transitory computer-readable recording medium having a program stored thereon, which is computer-executable, for transmitting packet data to a packet receiving apparatus, the program causing the computer to execute a method comprising:

an A/V data information acquisition step of acquiring A/V data information including at least one information from among input terminal information which indicates a terminal to which AN data is inputted, data format information which indicates a data format of the A/V data, and attribute information which indicates an attribute of the A/V data;

a data input step of accepting input of the A/V data and non-A/V data;

a transmission condition setting/managing step of extracting, from the non-A/V data or the A/V data, at least one information from among: billing information or reproduction control information or copy control information for the A/V data; packet data transmission permitting information; and MAC address information for a transmission destination, and generating, from the extracted information, encryption mode information which indicates an encryption mode during transmission of the A/V data;

an encrypted transmission data generation step of performing encryption control on the A/V data inputted from said data input step based on a transmission condition which is determined by combining the input terminal information, the data format information, and the attribute information, and generating encryption-controlled transmission data with an encryption information header by adding, to the encryption-controlled A/V data, the encryption information header which is based on the encryption mode information;

a packetization step of generating a packet by adding a packet header which combines one or more protocols from among a HyperText Transfer Protocol, a Transmission Control Protocol, a Real-time Transport Protocol, a User Datagram Protocol, and an Internet Protocol to data including the encryption-controlled transmission data with an encryption information header generated by said encrypted transmission data generation unit, and adding information representing discontinuity of an MPEG stream in terms of system time base, at a point where time-based discontinuity occurs in the A/V data;

an authentication step of performing authentication processing with the packet receiving apparatus;

a transmission protocol determination step of determining a transmission protocol for the A/V data between the packet transmitting apparatus and the packet receiving apparatus, by using at least one of the input terminal information, the attribute information, and information which indicates a transmission mode specified by the packet receiving apparatus; and a transmission step of transmitting, in accordance with the transmission protocol determined in said transmission protocol determination step, the packet including the encryption-controlled transmission data with an encryption information header generated by said packetization unit to the packet receiving apparatus, after authentication processing with the packet receiving apparatus is completed through the authentication processing, wherein, when the A/V data is accumulated in a recording medium which is made up of a plurality of data block areas having a predetermined size, and a recording position of the A/V data is managed with an identification number of one of the plurality of data block areas and offset information from the beginning of the data block area, said program controls the computer so that only the A/V data is packetized and transmitted to the packet receiving apparatus by excluding unneeded data that is recorded outside a range specified by the identification number and the offset information.

* * * * *

UNITED STATES PATENT AND TRADEMARK OFFICE
CERTIFICATE OF CORRECTION

Page 1 of 1

PATENT NO.        : 8,213,768 B2
APPLICATION NO.   : 11/885568
DATED             : July 3, 2012
INVENTOR(S)       : Yoshihiro Morioka It is certified that error appears in the above-identified patent and that said Letters Patent is hereby corrected as shown below:

On the Title Page

Please insert the following:

Item -- (30)    Foreign Application Priority Data

March 8, 2005    (JP) .................................... 2005-063290 --

Signed and Sealed this
Eighteenth Day of December, 2012

David J. Kappos
*Director of the United States Patent and Trademark Office*